TIME DIVISION SWITCHING SYSTEM

Filed April 24, 1962 17 Sheets-Sheet 1

INVENTORS: H. INOSE, Y. KAWAI, Z. KOONO, M. TAKAGI, Y. YASUDA, Y. YOSHIDA

BY R. C. Winter

ATTORNEY

TIME DIVISION SWITCHING SYSTEM

Filed April 24, 1962

Dec. 14, 1965 HIROSHI INOSE ET AL 3,223,784

TIME DIVISION SWITCHING SYSTEM

Filed April 24, 1962 17 Sheets-Sheet 5

Dec. 14, 1965 HIROSHI INOSE ET AL 3,223,784

TIME DIVISION SWITCHING SYSTEM

Filed April 24, 1962 17 Sheets-Sheet 7

Dec. 14, 1965 HIROSHI INOSE ET AL 3,223,784

TIME DIVISION SWITCHING SYSTEM

Filed April 24, 1962 17 Sheets-Sheet 10

Dec. 14, 1965 HIROSHI INOSE ET AL 3,223,784

TIME DIVISION SWITCHING SYSTEM

Filed April 24, 1962 17 Sheets-Sheet 14

United States Patent Office 3,223,784

Patented Dec. 14, 1965

3,223,784
TIME DIVISION SWITCHING SYSTEM

Hiroshi Inose, Shibuya-ku, Yoichi Kawai, Bunkyo-ku, Zenya Koono, Musashino, Mikio Takagi, Shinagawa-ku, Yasuhiko Yasuda, Koganei, and Yuichi Yoshida, Kitatama-gun, Japan, assignors to Bell Telephone Laboratories, Incorporated, New York, N.Y., a corporation of New York Filed Apr. 24, 1962, Ser. No. 189,873
35 Claims. (Cl. 179—15)

This invention relates to communication systems, and more particularly, to a telephone system operating on a time separation basis.

The current practice in telephone systems is to establish an electrical connection between a calling and a called line, which connection is maintained without interruption for the duration of the call. Dependent upon traffic requirements, quantities of switching facilities are maintained in various centralized locations and specific idle switches therein are selected as required to establish a link for a particular call. Such a system arrangement is referred to as "space separation" in which privacy of conversation is assured by the separation of individual conversations in space.

In contrast, other telephone systems operate on a time separation basis in which conversations carried on concurrently among a number of active pairs of lines share a single transmission path. Privacy of each conversation is assured in such systems by the separation of individual conversations in time. Thus each call is assigned to the common transmission path for an extremely short but rapidly and regularly recurring interval, and the connection between any two lines in communication is completed only during these assigned intervals or time slots. Signal samples which retain essential characteristics of the voice or other information are transmitted in these time slots and are utilized in the called line to reconstruct the original information.

It is necessary that systems operating on the time separation basis remember which lines have been assigned to which time slots in the recurring cycle so that active lines will always be sampled at the proper time. Such operations may be asynchronous to the extent that the time slot assigned to the calling line may differ from that assigned to the called line. A system employing such asynchronous operation is described in a patent application of H. Inose and J. P. Runyon, Serial No. 24,994, filed April 27, 1960, now patent 3,172,956, issued March 9, 1965. This type of operation is achieved by assigning an idle time slot to the calling line upon receipt of the initial request for service, determining the status of that time slot in the switching location of the called line and, if the latter is busy, locating an idle time slot and assigning it to the called line. Conversation is thereafter delayed in transit so as to arrive at the proper destination in the appropriate time slot. Such arrangements solve a blocking problem otherwise encountered in time separation systems.

It is a general object of this invention to provide an improved asynchronous time separation communication system.

It is another object of this invention to improve the manner of supervising conversations in a time separation telephone system.

It is a further object of this invention to provide more economical line circuitry for an asynchronous time separation telephone system.

It is still another object of this invention to simplify common control equipment and its interconnection in an asynchronous time separation switching system.

These and other objects of the invention are attained in one specific illustrative embodiment wherein a time separation telephone system comprises distinct groups of telephone lines remote from one another and connected through corresponding switching networks referred to as line concentrators to a common control center or central office essentially in the manner described in D. B. James et al. Patent 2,957,949, issued October 25, 1960. The telephone lines associated with each line concentrator are controlled on a time separation basis such that the various concentrators are each connected to the control center via a corresponding common transmission link or channel.

When a calling line associated with a first concentrator desires connection to a called line associated with a second concentrator, equipment at the central office initially assigns an idle time slot to the calling line. It then proceeds to determine the status of that time slot in the second concentrator. If the time slot is idle in both concentrators, equipment at the central office will complete the connection in a routine manner. However, if the time slot is occupied on another call in the second concentrator and thus not available to accommodate the instant call, the central office equipment is interrogated further in order to determine the first available time slot in the second concentrator. This selection bears no relationship to the time slot assigned to the calling line.

Upon locating such an idle time slot in the second concentrator, the identity of both time slots is registered and transmitted to switching circuitry at appropriate times so as to complete the connection to the calling party in one time slot and to the called party in another time slot. In this fashion a transposition of time slots is accomplished, thus obviating the time slot blocking problem prevalent in synchronous time separation systems in which the same time slot must be assigned to a connection involving a pair of line concentrators.

In accordance with this specific embodiment of the invention, the sequence of operations involved in establishing a connection through the system is referred to as the call progress sequence. Each step in the sequence is identified by a distinct call progress code word. As the establishment of the call proceeds, the call progress words are changed in sequence and directed to particular apparatus requiring a knowledge of the call status. In order to facilitate this sequence in an economical manner, the equipment is arranged so as to permit the multidigit call progress code words to require a change in a single digit in the transition from one code word to the next code word.

The line circuit employs delta modulation techniques which permit supervision over the same leads of the common transmission channel between remote concentrator and central office as carry the voice signals. Such "highway supervision" permits the transmission of idle and called line identification signals through the time separation gate connecting the calling line to the common transmission channel.

Facilities in the central office detect signals received over the common channel from the calling line and discriminate between supervisory indications and speech signals delivered after a talking connection is established with the called line. Such equipment necessarily discriminates between busy and idle lines by observation of the signals actually transmitted through the transmission channel. These functions are performed by observation of the available signals and calculation of the probability of existence of speech signals according to the number of signals present in a predetermined time interval.

We have found that on average the probability of existence of a delta modulated speech signal in the transmission channel is fifty percent when the line is in the off-hook or connected condition. When the line is in the on-hook condition, or during the dial break intervals, a disconnect condition is present in which the signal is absent except for spurious pulses. Considering that the speech signal recurs in successive cycle or frame periods, the connect or disconnect states may be identified by distinguishing between the probabilities of occurrence of signals in the assigned time slot in successive frames. Circulating delay lines advantageously are employed for this purpose. Thus one delay line is arranged to reflect the continual absence of signal for a prescribed period of time indicative of the disconnect state, and a second delay line cascaded with the first is arranged to reflect the presence of signal during each of a succession of the prescribed periods indicative of the connect state. Additional delay lines observe the connect state signal during a sufficient period to determine the presence of the dial make, dial break, pause between dialed digits, and the restoration of the line to the on-hook condition. Each of these observations is made during a particular time in the progress of a call, as determined by the common control equipment.

In this instance the delta modulator and demodulator act as the time separation line gates as well as performing their coding function. Due to the provision of equipment utilizing such techniques, tone ringing is employed on the speech channel and is also transmitted in delta modulated form.

It is a feature of this invention that distinct circuitry and components be arranged in an asynchronous time separation communication system to permit their operation during the establishment of a connection through the system by a sequence of multidigit call progress codes in which a single digit changes from one code word to the next code word in the sequence.

It is another feature of this invention that the line circuits contain devices employing delta modulation techniques such that a delta modulator and a delta demodulator perform a time separation gating function in addition to coding information transferred from the line circuit to the common transmission channel.

More particularly it is a feature of this invention that supervisory indications including the designation of a called line be applied to an active line during an assigned time slot in a recurring cycle of time slots and initiate the signals which are modulated by the speech and supervisory signals on the active line.

It is a further feature of this invention that central office facilities observe signals received from an active line over the common transmission channel, discriminate between speech and supervisory signals based on the probability of the existence of speech signals during a predetermined time interval, register called line designations and initiate action to connect called lines to the calling lines.

A complete understanding of this invention and of these and various other features thereof may be gained from consideration of the following detailed description and the accompanying drawing, in which.

Figure 1:
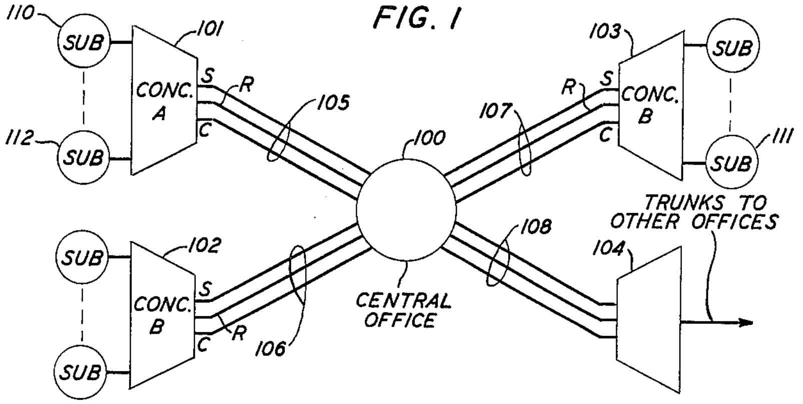
FIG. 1 is a block diagram representation of a telephone system comprising a central office, a plurality of remote concentrators connected to the central office, and a plurality of subscriber lines or trunks to other telephone offices connected to each of the remote concentrators.
Figure 2:
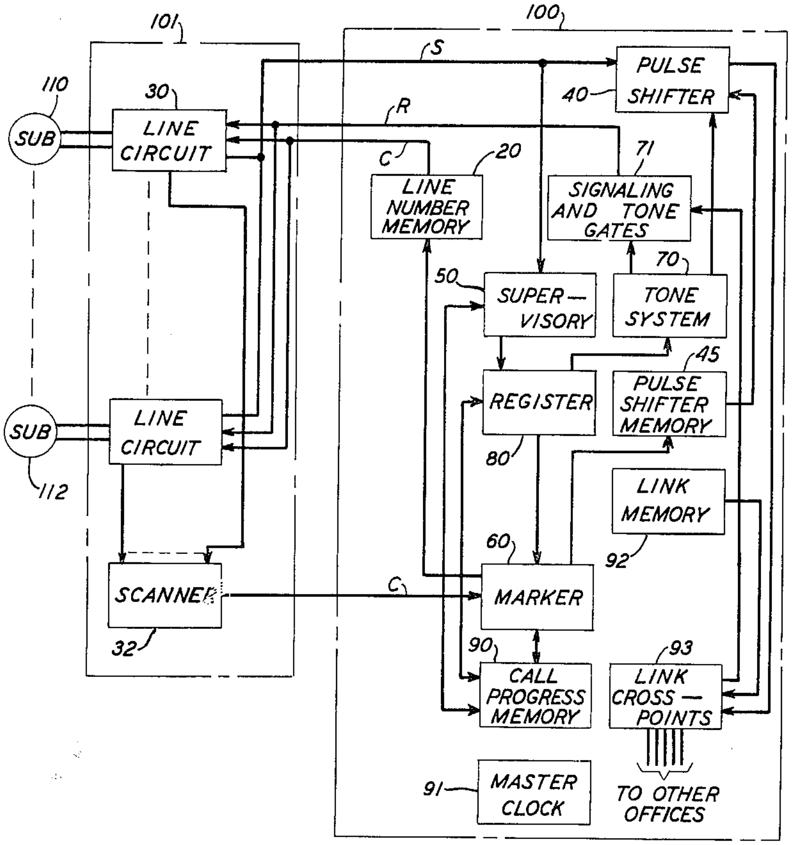
FIG. 2 is a representation in block diagram form of the particular facilities available in the central office to serve one of the remote concentrators.
Figures 7, 17:
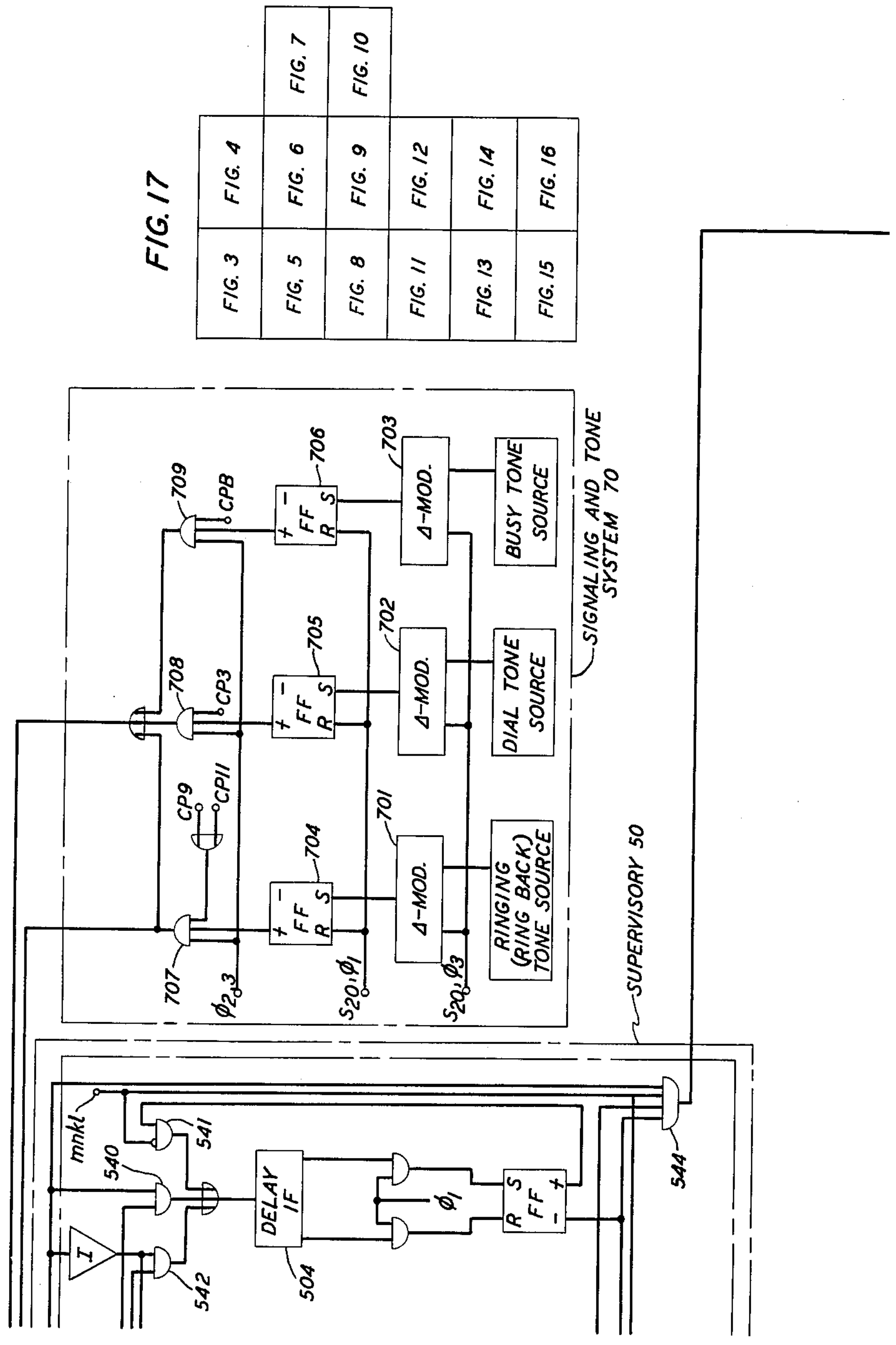
Figure 18:
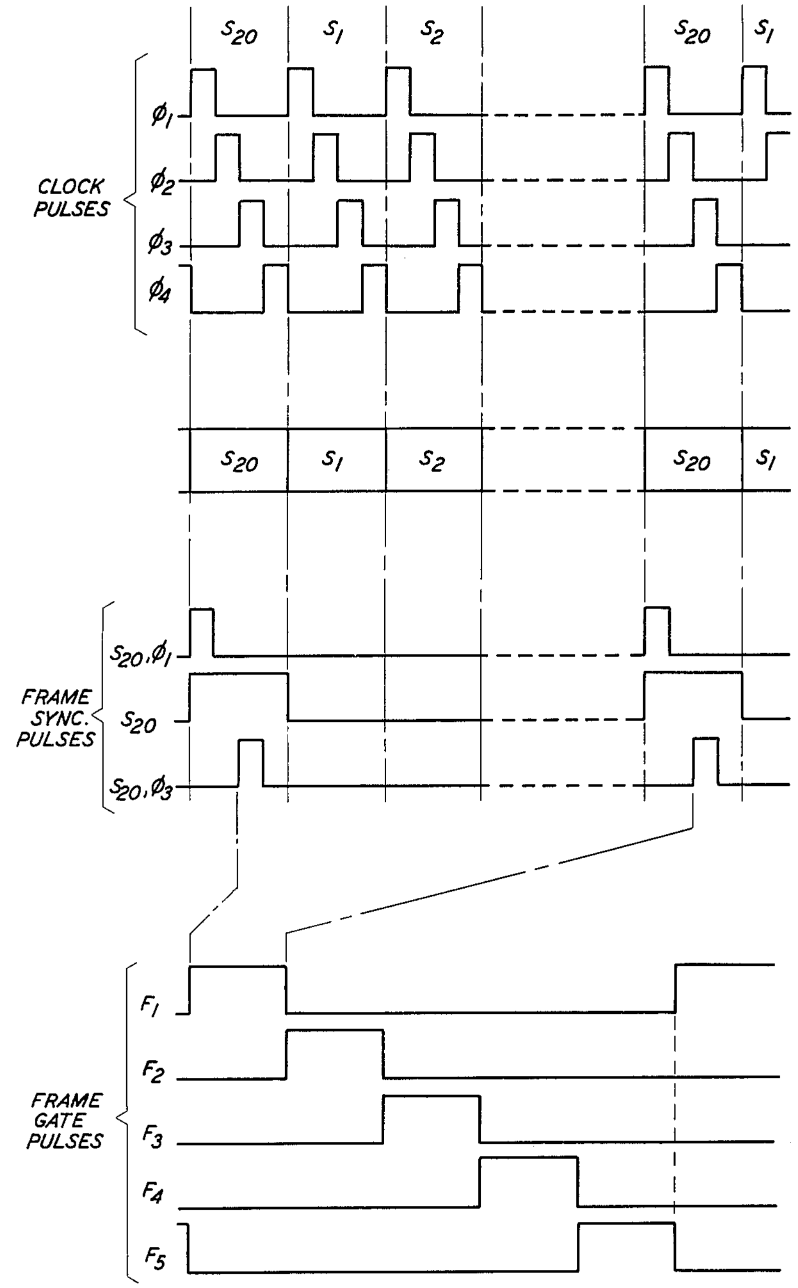
Figure 19:
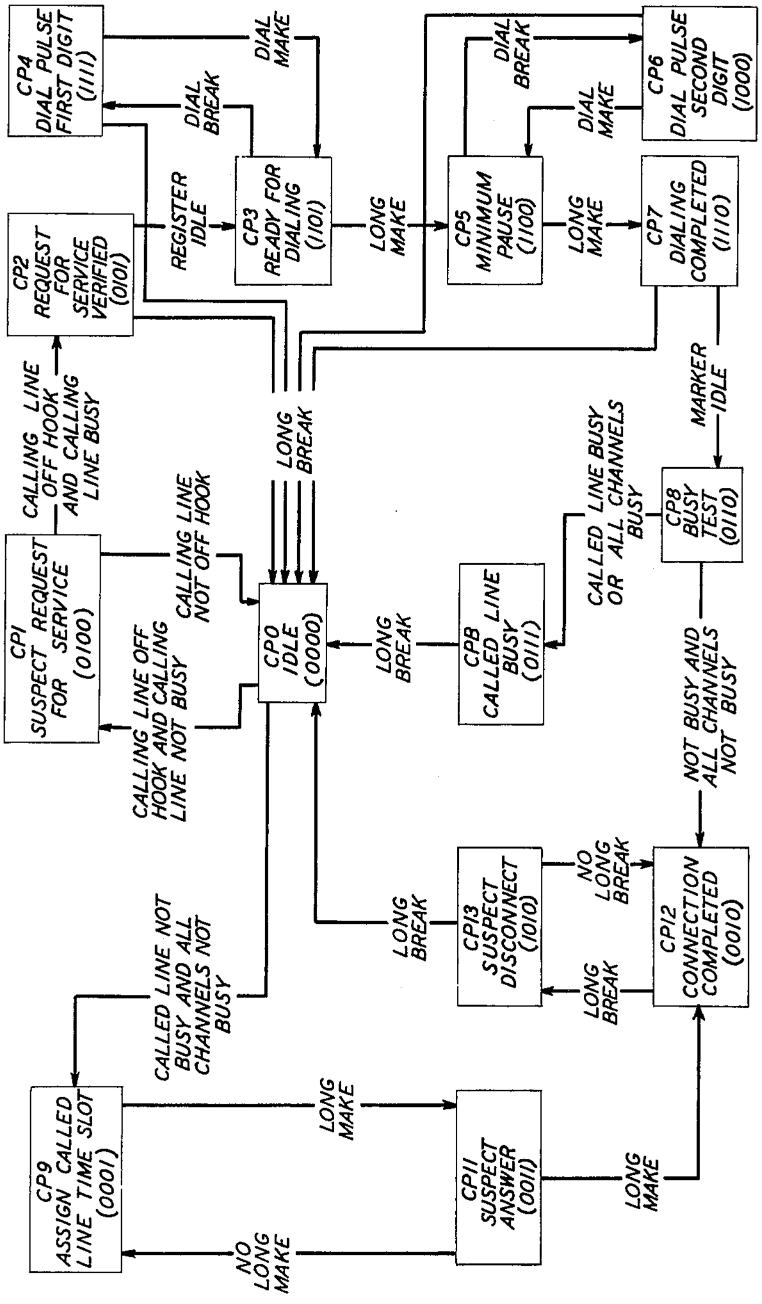

FIGS. 3 through 16 are a schematic representation of the specific embodiment of FIGS. 1 and 2, the arrangement of FIGS. 3 through 16 being shown in the key diagram of FIG. 17;

FIG. 18 is a time chart of one office cycle in the common control operation at the central office; and FIG. 19 is a flow chart of the operation of various components in the establishment of a talking path through the network utilizing the call progress sequence.

Turning now to the drawing, the time division telephone system depicted in FIG. 1 is similar to the telephone system disclosed in the aforementioned Inose et al. patent which will be described in general terms hereinafter to provide a basis for the detailed description of the improvements realized in accordance with this invention and depicted in FIGS. 2 through 20.

In FIG. 1 the telephone office comprises the remote concentrators 101, 102 and 103 and the interoffice trunk facilities 104, each connected via corresponding transmission channels 105 through 108 to the common control equipment at the central office 100. The remote concentrators are so named because of the connection thereto of a plurality of individual telephone subscriber lines concentrated in the same remote area. Each interconcentrator or intraconcentrator connection as well as the connections between a concentrator and a foreign exchange is completed through the central office 100 via the appropriate transmission channel or channels 105 through 108 on a time separation basis.

The central office 100 assigns to a calling subscriber line a particular time slot in a recurring cycle of time slots during which time information from the calling and called subscriber lines is transferred through the appropriate channel or channels 105 through 108. Similarly, other telephone connections are assigned distinct time slots in the recurrent cycle of time slots such that the various channels are shared in time by the active telephone calls which in turn are separated in time. A considerable saving in telephone cable is one beneficial result.

Operation of the telephone office on an asynchronous basis, as described in the aforementioned Inose et al. system, utilizes time slot transposition to overcome the blocking problem encountered in synchronous systems which fail to locate a common idle time slot. Thus subscriber 110, in requesting a connection to subscriber 111, may be assigned a first time slot by the central office 100 while the subscriber 111 is assigned a second time slot distinct from the first time slot assigned to subscriber 110. Information then is transmitted from subscriber 110 over then send (S) lead of the transmission channel 105 in the first time slot and is transposed in the central office 100 to the second time slot assigned to subscriber 111 for transmission over the receive (R) lead of channel 107. Similarly, information from subscriber 111 is transposed from the time slot assigned to his line to that assigned to subscriber 110.

The particular equipment required in the central office for this transposition is considered in some detail with reference to FIGS. 2, 4, 14 and 16. Individual equipment is provided in the central office for each concentrator connected thereto to perform this transposition.

Each subscriber line associated with remote concentrator 101, as shown in FIG. 2, is connected to the concentrator switching network via a two-wire talking path. Thus subscriber terminal 110 is connected through a line circuit 30 to the send and receive leads in the transmission channel 105. Gates contained in the line circuits connected to active subscriber lines are enabled in distinct, selected time intervals or time slots of a repetitive cycle of time slots, as noted in the timing chart of FIG. 18. These gate operations are controlled by the line number memory 20 and the telephone subset itself. The remote concentrator control comprising the scanner 32 in turn transmits and receives directive signals via control leads (C) of the transmission channel 105.

In order to establish a connection between two subscribers, the system first detects a request for service through a continual scanning process involving the scanner 32 at the remote concentrator 101. The marker 60 is provided at the central office for the purpose of identifying a calling subscriber's request for service. Upon receiving an indication for the scanner 32 that a telephone is in the off-hook or busy conditon together with signals identifying the particular line being scanned, the marker 60 signals the line number memory 20 to determine whether the designation of the scanned line is recorded therein, indicating that it is busy. If the line was previously idle, the marker 60 assigns an idle time slot, and the line designation is recorded in the line number memory 20 in the assigned time slot. The request for service is verified by the arrival at the marker 60 of another off-hook signal from the scanner 32 in the next scanning interval assigned to that line. Thus the line number memory 20 keeps track of all active lines in the system as well as the time slots assigned to each one.

The call progress memory 90 causes an idle register 80 to be engaged preparatory to the receipt of the called party's identifying digits. Upon seizure of an idle register 80, a signal is transmitted to the tone system 70 which thereupon beings transmitting a distinct tone through the gates 71 and the receive lead of the transmission channel 105 to the line circuit 30 for the calling subscriber 110, which tone serves to alert the calling line to begin transmitting the characteristic digits of the called line. These dial pulse signals are transmitted through the line circuit 30 and over the send lead of the transmission channel 105.

The supervisory circuit 50 detects all signals transmitted to the central office over the send lead and distinguishes between such signals and the voice signals also transmitted over the send lead. Upon detecting the digits identifying the called line, the supervisory circuit 50 delivers such indicia to the priorly engaged register 80. As soon thereafter as the busy test equipment is available, the condition of the called line will be investigated, and if it is found to be idle, the register will transmit the stored digits to the marker 60. The marker thereupon controls the assignment of an idle time slot to the called line in conjunction with the line number memory 20.

With both the calling and called lines assigned time slots, the marker 60 transmits the time slot assignments to the pulse shifter memory 45. The pulse shifter memory 45 in turn counts the number of time slots between the time slot assigned to the called line and that assigned to the calling line and stores an indication of the difference between the respective time slots in a delay line memory. The stored information is read out during each office cycle and serves to enable gates in the pulse shifter 40. In this fashion information received in the pulse shifter 40 from one of an active pair of lines in the corresponding time slot is delayed until the appearance of the time slot assigned to the other line in the active pair, at which time the information is gated out of the pulse shifter 40 and transmitted to the particular called line.

As depicted in FIG. 2, lines associated with a single remote concentrator 101 may be connected together through the central office 100. However, this service may be readily extended to include connections between subscribers in distinct remote concentrators or between a concentrator connected to the central office 100 and a concentrator connected to a foreign office via trunk links. The manner in which such service may be effected is considered in some detail in the aforementioned Inose et al. patent.

*Office timing*

In order to assist in an understanding of the detailed operation of this system, it will be necessary to first consider the particular timing involved and for this purpose a specific timing arrangement, as illustrated in FIG. 18, will be described. Thus consider that one hundred subscriber lines are connected to the remote concentrator 101 and that twenty time slots $S_1, S_2 \ldots S_{20}$ are available and deemed sufficient to handle the traffic requirements for this capacity. The twenty time slots will appear in a repetitive cycle F, referred to as a frame. Nineteen of the time slots $S_1$–$S_{19}$ are utilized for speech transmission and one time slot $S_{20}$ for framing or synchronizing information; i.e., for assuring that the time slot interval occurs at precisely the same time in the remote concentrator 101 as in all components at the central office 100.

The repetition rate of each frame is chosen as 50 kilocycles per second, such that a single time slot is 1 microsecond in duration. One binary digit or bit of information may be transmitted in each time slot. Thus with twenty time slots of 1 microsecond duration in each frame, twenty binary digits or bits of information may be transmitted in each 20 microseconds frame interval.

The various gates in the system are controlled by precisely timed signal pulses so as to transfer information between the calling and called lines in the preassigned time slots. Particular control functions are performed once in every five frames. During the second and third frames, $F_2$ and $F_3$, the identification of requests for service as well as the busy test of called lines occur. The pulse shifting or time slot assignment operation is performed during the third and fourth frames, $F_3$ and $F_4$.

Each time slot S of one microsecond duration is also divided into four phases $\varphi_1$–$\varphi_4$, and particular control functions are performed by clock signals transmitted during particular phases $\phi$ of a time slot S in a particular frame F. Thus, for example, an operation occurring in frame 1, time slot 18, phase 3 would be designated $F_1S_{18}\phi_3$.

Timing within a frame is established by a common clock pulse source at the central office 100, designated the master clock 91 in FIG. 2. This pulse source serves all concentrators and all office control equipment to maintain proper synchronism and perform all timing operations in the manner described in greater detail in the aforementioned James et al. patent. This source provides pulse signals to distinct phase $\varphi$, time slot S, and frame F conductors, as required. Thus a point in time at the central office 100 is defined by an indication of the frame, time slot and phase. Individual frame, time slot and phase conductors are employed in various combinations to establish the proper timing for operation of various of the control devices, and individual conductors are designated accordingly in the schematic representation of the circuit illustrated in FIGS. 3 through 20.

Before describing the operation of the system in detail, it may be of assistance to consider the specific elements which make up the major components illustrated in block form in FIG. 2.

*Telephone line circuit*

Figure 3:
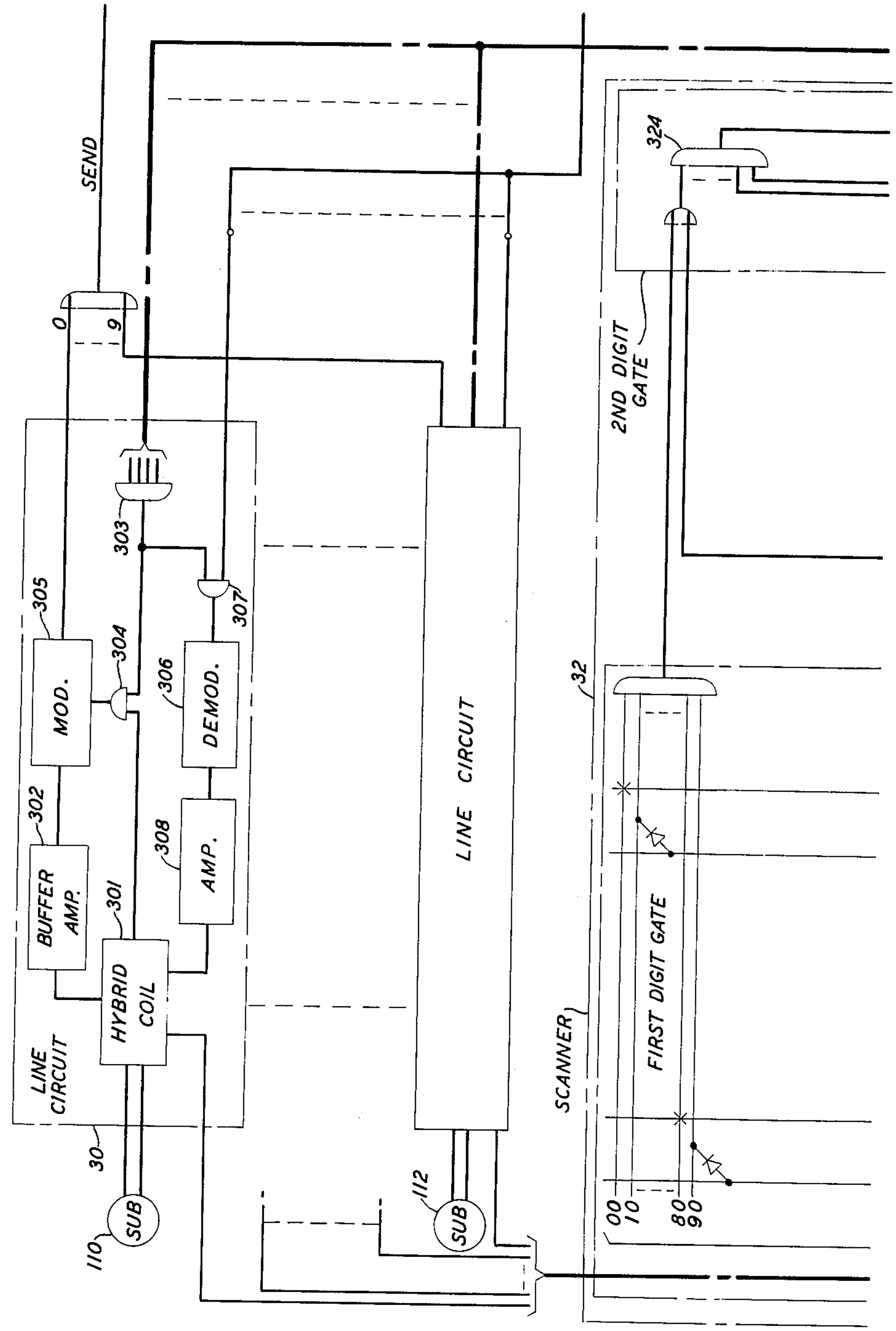

The line circuit 30, FIG. 3, comprises the usual hybrid coil 301 which performs the conversion from the two-wire subscriber line to the four-wire transmission channel. The outgoing speech and supervisory signals are then stored and amplified by the buffer amplifier 302, such that upon receipt of a gating signal from the line number memory 20 in the central office 100 through AND gate 303 and AND gate 304, the modulator 305 will code the signals and transfer them to the send lead of the transmission channel 105. The modulator 305 converts the input voice and supervisory signals to output pulse code signals by virtue of a delta modulation process known in the art in which the line designation signal from AND gate 304 serves as the carrier. In order to assure than information is available to be transmitted over the channel 105 during the time slot interval assigned to this line, the AND gate 304 must also be activated by a signal from the hybrid coil 301. In this fashion the modulator serves as a combination signal transfer gate and information coder.

In similar fashion, coded information received from the cenrtal office over the receive lead of the transmission channel 105 is gated to the demodulator 306 through AND gate 307 upon receipt of the corresponding line designation signal from AND gate 303 in the assigned time slot. The demodulator 306 converts the coded signals to speech signals which are amplified in amplifier 308 and transmitted through the hybrid coil 301 to the telephone subset 110.

*Line scanner*

Figure 5:
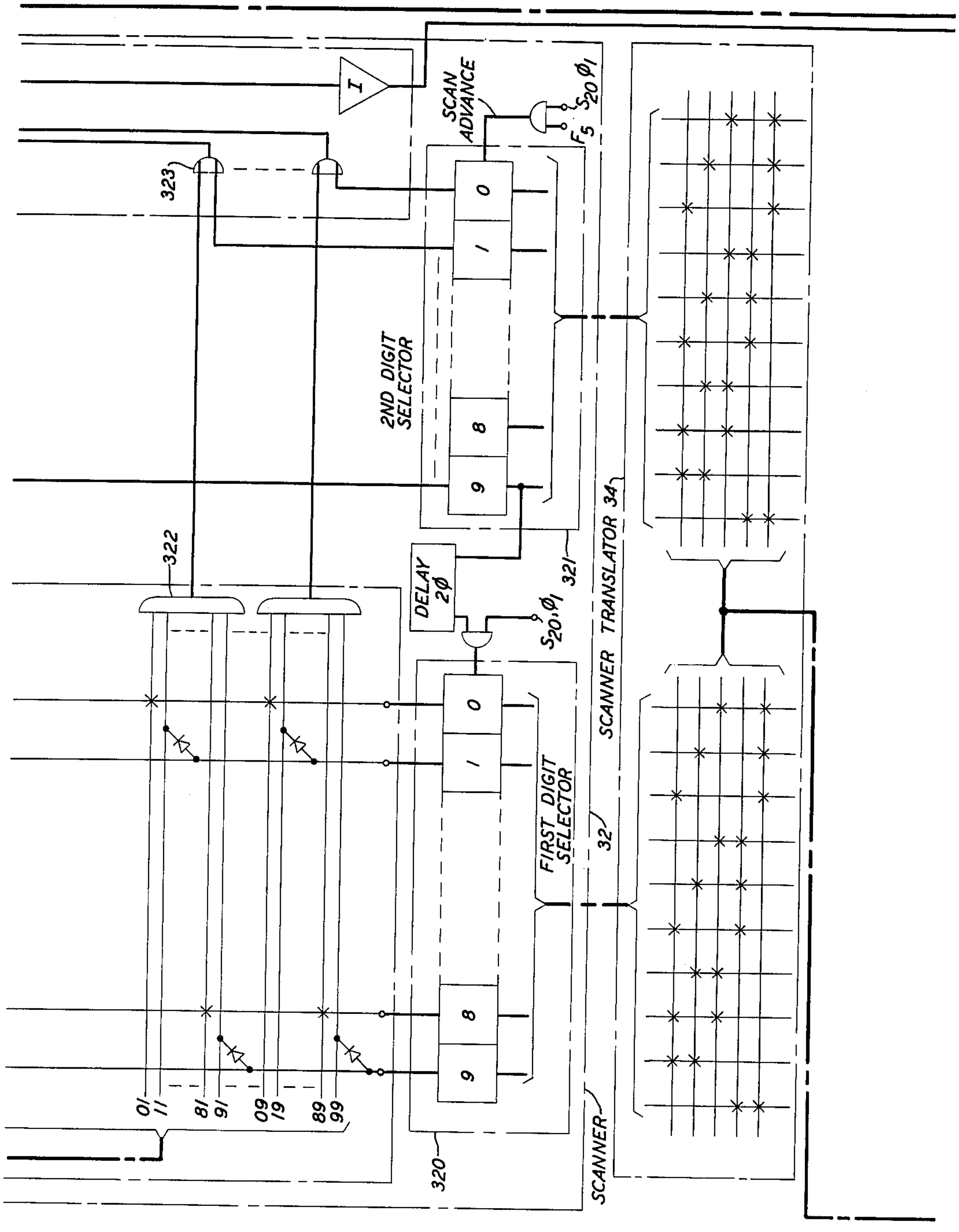

In order to detect a request for service by a subscriber, it is necessary first to determine that the telephone has become active or, as commonly termed in the art, "off-hook." The off-hook condition results in a change in the voltage condition in the hybrid coil 301 of the line circuit, which change is reflected in the line scanner 32, FIGS. 3 and 5, connected to each line circuit by corresponding scanning leads. The scanner 32 contains a pair of ring counters in first and second digit selectors 320 and 321 for establishing the identity of the calling line.

In the instant 100 line system the line is identified by two digits. All of the line scanning leads terminate in a first digit gate including a matrix receiving the output signals of the first digit selector 320. The terminated scanning leads are arranged in groups of ten such that all lines having the same first digit will be interrogated concurrently by a distinct output of the first digit selector 320. The presence of an off-hook condition in one or more of the lines under interrogation having the common first digit will be reflected by the absence of an output from the first digit gate.

These first digit gate outputs are received by the second digit gate which also receives the counter outputs of the second digit selector 321, establishing the particular second digit of the line under interrogation. The second digit selector 321 thus determines which one of a group of ten lines having a common first digit is being interrogated. The selection provided by the second digit selector 321 is determined by the absence of a signal on the output lead corresponding to the digit under interrogation, such that the second digit AND gate 324 will provide an output only when the off-hook signal is not present on the line being interrogated.

Consider, for example, that line number 81 is presently being scanned and is off-hook. In this situation line 81 will reflect the off-hook condition in the corresponding scanning lead and horizontal lead 81 of the first digit gate in the scanner 32. The ring counters in the first and second digit selectors 320 and 321 are set to 8 and 1, respectively, the second digit being changed in $F_5S_{20}\varphi_1$ and in turn changing the first digit selector after each count of ten. Thus the line 81 is observed for five consecutive frames.

The horizontal leads designating the first digit in ten of the line equipment numbers are interrogated simultaneously; viz., 80, 81 . . . 89, and the busy ones will activate the corresponding crosspoints of the matrix column extending from output 8 in selector 320. The corresponding first digit AND gates, including 322, each provide an output only when the off-hook indication is absent from all of its inputs. Thus AND gate 322, receiving the off-hook indication on horizontal 81, fails to provide an output at this time. Similarly, OR gate 323 of the second digit gate fails to receive an input from the corresponding first digit AND gate 322 or from the column output of the second digit selector designating the second digit 1. Thus the second digit AND gate 324 fails to provide an output. An inverter at the output of AND gate 324 thereupon signals the marker 60 that the line identified by the equipment number 81 is off-hook.

*Call progress memory*

It is apparent that the myriad of switching operations occurring in the system in precisely timed intervals requires that the progress in the establishment and maintenance of a call be guided by additional control equipment. The call progress code number is the designation accorded the current status of a call for the benefit of all elements in the control equipment at the central office 100 and remote concentrator 101. Call progress code numbers are stored in a call progress memory 90, FIGS. 13 and 15, comprising circulating delay lines 901–904. In $\varphi_3$ of each time slot the current call progress code relating to a corresponding call is written into the delay lines 901–904. Arrival of each new code serves to erase the recirculating, priorly stored, call progress code. The new code is then utilized, upon appearance of the same time slot, in the next frame, to control the various switching and control elements. The various call progress codes are indicated in the flow chart of FIG. 19 to be discussed in detail hereinafter.

The equipment is arranged such that successive call progress codes, regardless of the pattern followed by a given call, each vary from the preceding code for the given call in only one digit. Because of this single digit transition, each succeeding call progress code causes a pulse to be written into only a single one of the delay lines 901–904 or erased therefrom. For example, a transition from the second call progress code CP2 (0101) to the third call progress code CP3 (1101) causes a digit pulse to be written in delay line 901 in the time slot in which the code transition occurs, and a transition from the fourth call progress code CP4 (1111) to the third progress code CP3 (1101) causes erasure of a digit pulse stored in the delay line 903 in that time slot.

*Line number memory*

Figure 8:
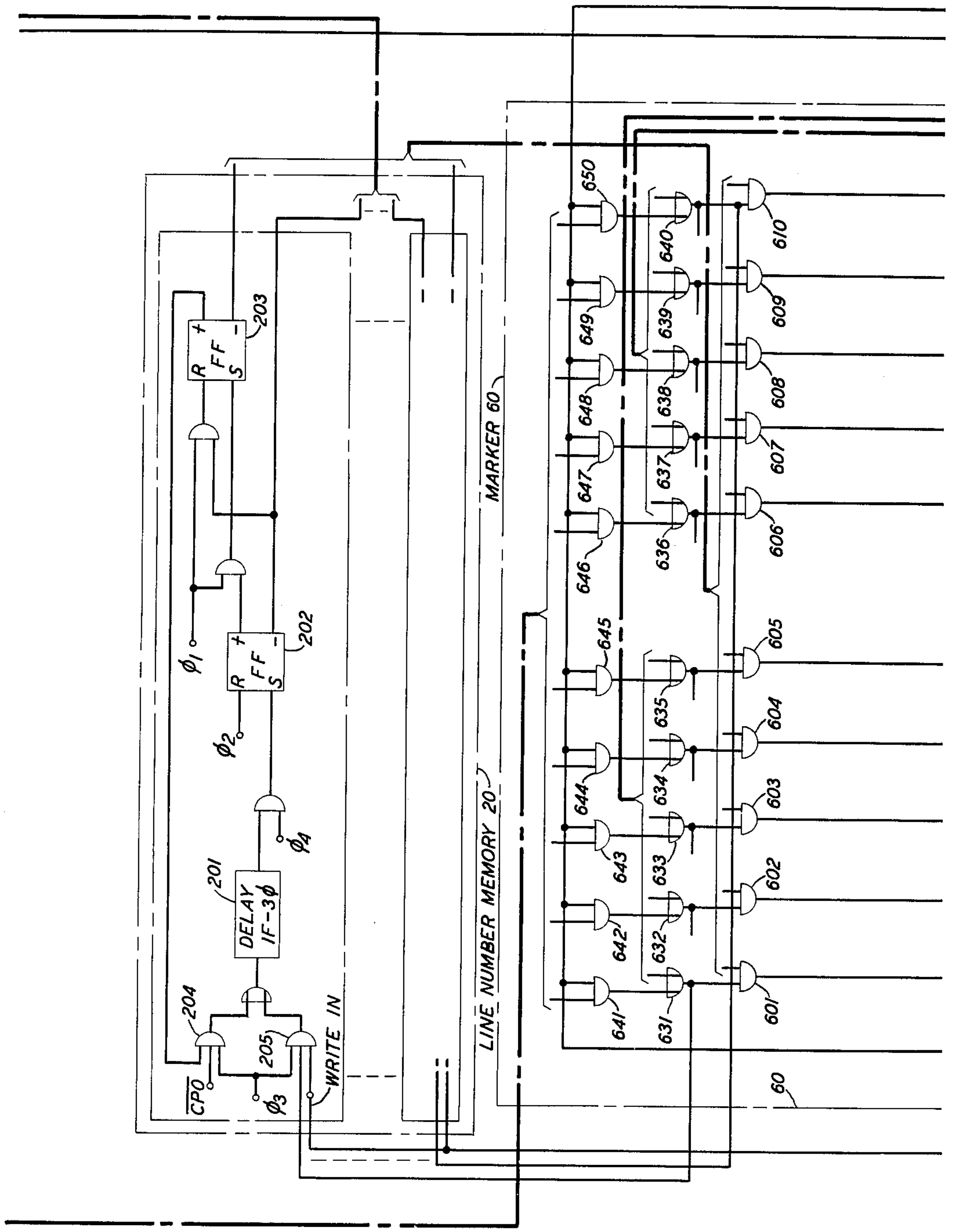

A logical diagram of the line number memory 20 is contained in FIG. 8 and consists of ten delay lines, such as 201, each storing twenty bits of information and providing a delay equivalent to one frame minus $3\varphi$. When a time slot is assigned to a particular subscriber line, the identity of that line is registered in a specific combination of four of the delay lines, two out of five in each of two groups of five. Information contained in the delay lines is advanced simultaneously and read out in parallel form in the appropriate time slot of each frame.

The delay line outputs are received in flip-flop registers, such as 202, which afford an indication, during $\varphi_1$ of the time slot, of the particular binary state of the digit received from the corresponding delay lines. These flip-flops are reset by a $\varphi_2$ pulse in each time slot. An additional flip-flop 203 is reset in $\varphi_1$ by the output of flip-flop 202 in the set state and is in turn set in the next $\varphi_1$ unless flip-flop 202 is reoperated in this next time slot. As a result, the output waveform of flip-flop 203 fully occupies the assigned time slot.

One of the outputs of four of the ten flip-flops such as 202 is transmitted to the corresponding subscriber line circuit. Similarly, one of the outputs of each of the ten flip-flops such as 203 is fed to the marker 60, the other output being applied to the inputs of the respective delay lines. AND gates such as 204 receive these feedback signals for insertion in the respective delay lines. When it is desired to erase information from the line number memory 20, a signal $\overline{CP0}$ indicating an active line is no longer received from the call progress memory 90, FIG. 2, at an input of these AND gates. Simultaneously, new information may be received from the marker 60 to be written in each delay line of the line number memory 20 at AND gates such as 205.

*The pulse shifter and memory*

Figure 4:
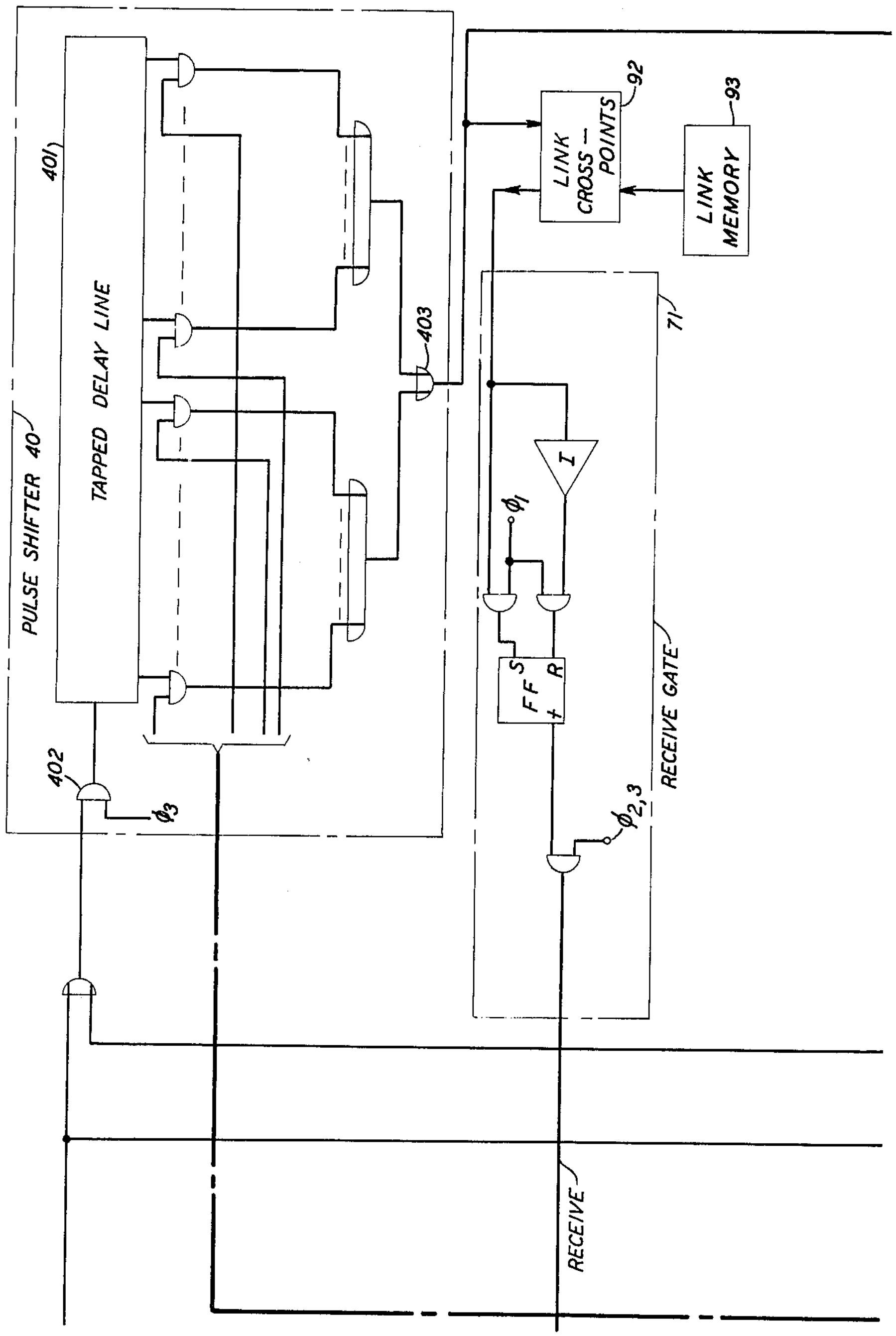

The pulse shifter 40, as depicted in FIG. 4, comprises in this specific illustrative embodiment of the invention, a tapped magnetostrictive delay line 401 and associated gates. The total delay is equivalent to one frame period and the line is equipped with twenty output taps spaced apart by a portion of the delay line equivalent to one time slot interval.

Information is received from the send lead of common transmission channel 105 at AND gate 402 and enters the tapped delay line 401 in $\varphi_3$ of each time slot. Each output of the tapped delay line 401 is received as one input to an AND gate, the other input of which is provided by the pulse shifter memory 45. The outputs of these AND gates are then combined in OR gate 403 and transmitted to the receive lead of a common transmission channel such as 105 through link crosspoints 92 and the corresponding receive gate such as 71. Operation of the link crosspoints 92 and associated memory 93 is described in detail in the aforementioned Inose et al. patent.

Figure 14:
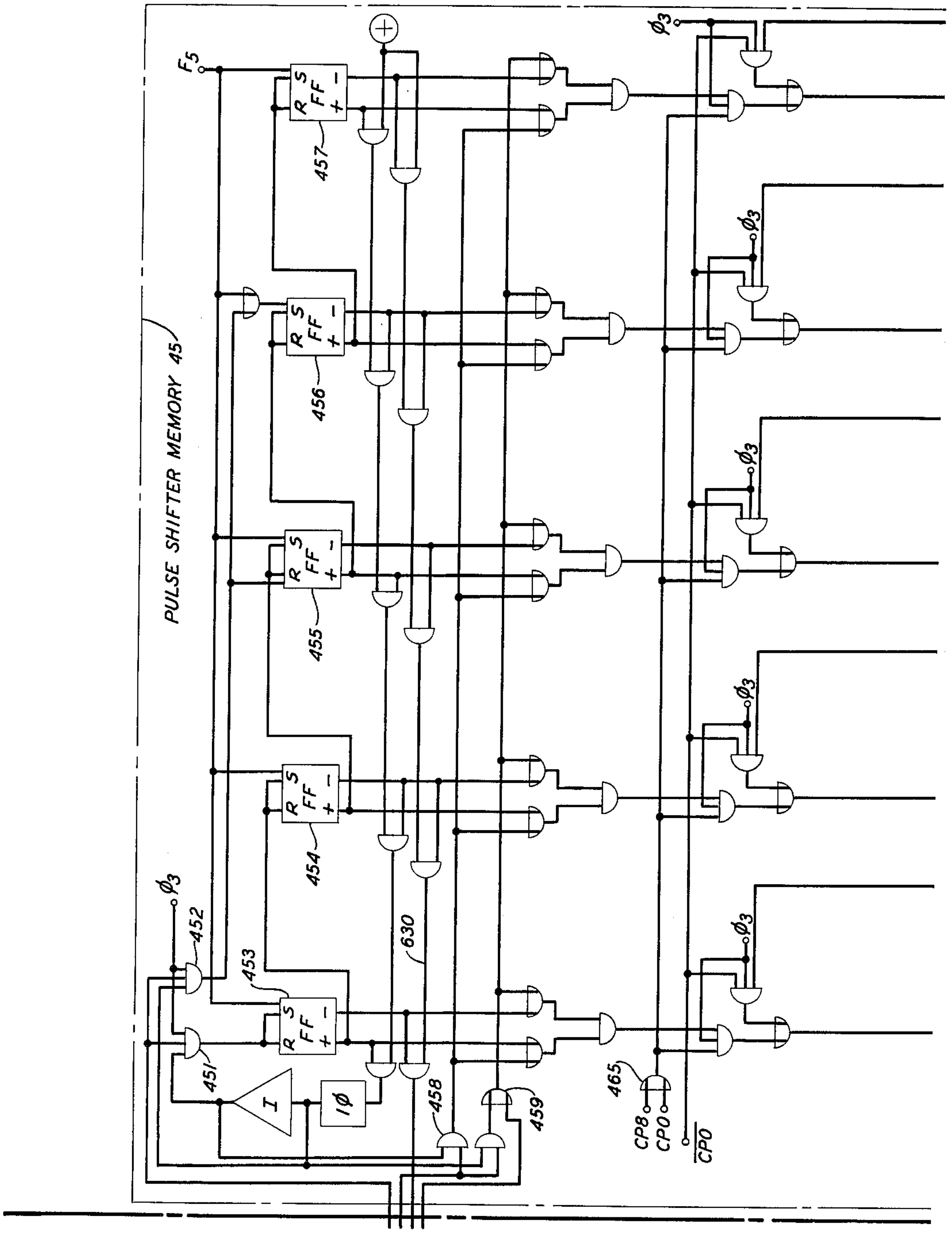
Figure 15:
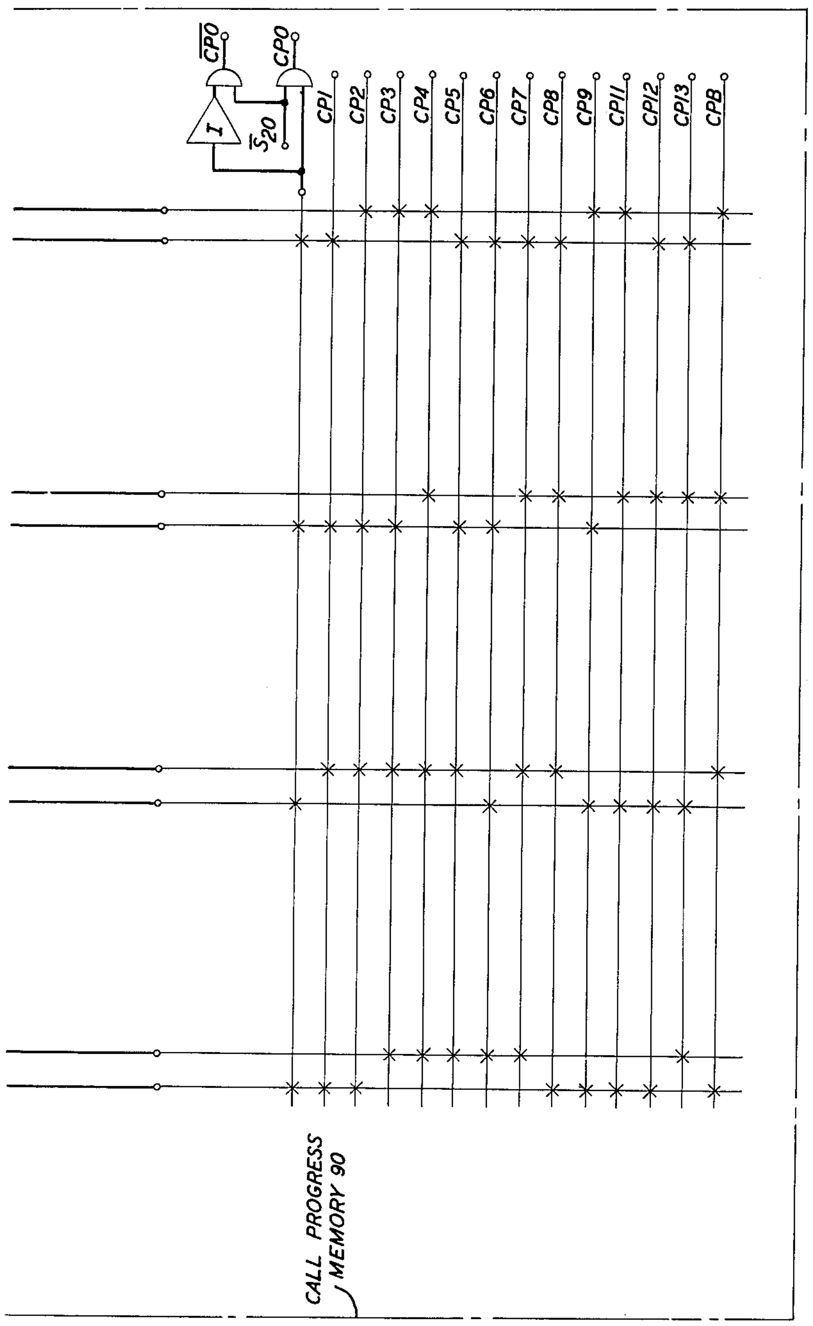
Figure 16:
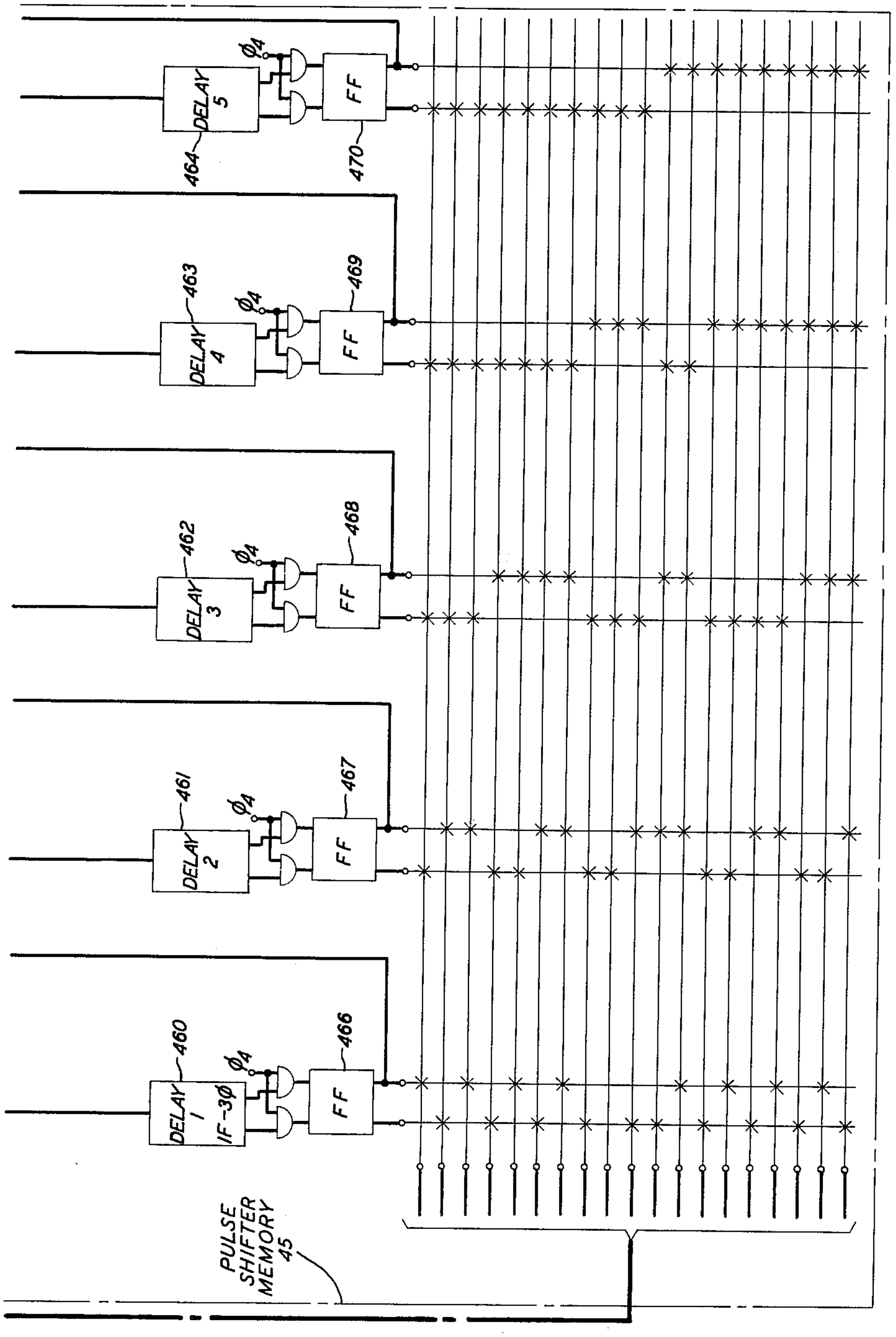

The pulse shifter memory 45 is shown in detail in FIGS. 14 and 16. This memory performs the functions of counting the number of time slots between the time slots assigned to the calling and called parties, storing the resultant difference numbers in the respective time slots of the calling and called lines in a delay line memory, and controlling the AND gates at the output taps of the tapped delay line 401 in the pulse shifter 40.

Consider, for example, that the calling line is assigned time slot 6 and the called line is assigned time slot 14. The pulse shifter memory 45 first counts the number of time slots between those assigned to the calling and called lines; i.e., 14−6 and 20+(6−14) where 20 is the number of time slots per frame. It then stores these numbers; viz., 8 and 12, in delay lines in the time slots assigned to the respective calling and called lines. The stored information is read out in every frame, translated in a diode matrix, and utilized to enable the appropriate AND gates in the pulse shifter 40; viz., gate 8 is opened in time slot 14 assigned to the called line and gate 12 is opened in time slot 6 assigned to the calling line.

The pulse shifter memory 45 is activated by a signal from flip-flop 624 in the marker 60, having a duration equivalent to the interval between the time slots assigned to the calling and called parties. This signal is received at AND gates 451 and 452, and at each appearance of a $\varphi_3$ pulse, AND gate 451 transmits a signal to activate flip-flop 453 in the counter comprising flip-flops 453–457. These five flip-flops are sufficient to count the required twenty time slots present in each frame interval.

Outputs are taken from the plus (+) and minus (−) sides of each flip-flop, such that the plus (+) outputs of the set stages correspond in binary code form to the number of time slots between the time slots assigned to the calling and called lines, and the binary number represented by the minus (−) outputs of the set flip-flops indicates the number of time slots between the time slots assigned to the called and calling lines.

The counter, having five stages, normally has the ability to count up to 32 in the binary code, a plus (+) output in this instance denoting a binary zero. A feedback circuit is employed to set the counter to 22 automatically upon reaching a count of 10. Thus registration of the number ten or 01010 in binary code results in outputs from each stage which produce a signal that removes one input from AND gate 451 and enables AND gate 452. The output of AND gate 452, upon receipt of the next $\varphi_3$ input signal, is directed to the flip-flops in such a fashion as to set the counter to a count of 22 rather than 11.

The marker 60 also signals the pulse shifter memory 45 with pulses applied to AND gate 458 and OR gate 459, FIG. 14, in the respective time slots of the calling and called lines. These signals are applied in coincidence with the respective plus (+) and minus (−) outputs of the counter flip-flops 453–457 through AND and OR gates to the delay lines 460–464, FIG. 16, concurrently with receipt through OR gate 465, FIG. 14, of an appropriate signal from the call progress memory 90, to be considered hereinafter.

An exception to this procedure is that upon the count of ten, the pulse from the marker 60 in the calling lines' time slot is transmitted through OR gate 459, rather than being applied to AND gate 458, and is thus applied to the delay lines in coincidence with the reset outputs of the flip-flops 453–457 registering a count of 21.

The delay lines have an established delay of one frame interval less $3\varphi$ or 19.25 microseconds. Thus information is read out of the delay lines 460–464 to set and reset the corersponding flip-flops 466–470, as appropriate, in $\varphi_4$ of the preceding time slot. It is rewritten in the delay lines 460–464 in $\varphi_3$ and recirculated until a signal from the call progress memory 90 indicates an idle condition of the line. The double rail output of the flip-flops 466–470 is applied to a matrix and directed therethrough to the proper AND gates at the outputs of the tapped delay line 401 of the pulse shifter 40, FIG. 4.

The counter in the pulse shifter memory 45 is reset in every fifth frame. Each time the count reaches twenty without an idle time slot being located for assignment to a line desiring service, a signal directed over lead 630, FIG. 14, to the marker 60 serves to advance the calling party's call progress to CPB to indicate a busy condition.

*Signaling and tone system*

The various tones employed in the instant system are the dial tone, the busy tone, and the ringback tone for the calling party and the ringing signal for the called party. Advantageously, the system employs tone ringing such that the ringing signal is identical to the ringback tone.

As indicated in FIG. 7, the signaling and tone system 70 comprises three delta modulators 701–703 which are connected respectively to the ringing and ringback tone source, the dial tone source and the busy tone source. Upon receipt of a clock pulse in $S_{20}\varphi_3$ the modulators each provide delta modulated output signals corresponding to the input tones. These coded outputs serve to set corresponding flip-flops 704–706. The flip-flops are reset in $S_{20}\varphi_1$ thus providing delta modulated rectangular waveforms covering the first through the nineteenth time slots to the AND gates 707–709.

As these tones are required, AND gates 707–709 are enabled by the appropriate call progress signals in $\varphi_{2,3}$ of each time slot. For example, when the identity of a calling party has been established and an idle register obtained, a call progress signal CP3 will be applied to AND gate 708 so that dial tone will be transmitted through receive gate 71 and over the receive lead of the transmission channel 105 to the calling line.

Similarly, when further investigation shows that the called party's line is busy, the appropriate call progress signal CPB will be applied to AND gate 709 and the busy tone delivered to the calling line during $\varphi_{2,3}$ of this assigned time slot. When the called line is idle as indicated by CP9 or CP11, ringing tone in coded form is applied from AND gate 707 to the tapped delay line 401 of the pulse shifter 40 while the coded ringback tone, being the same signal as the ringing tone, is applied to the receive lead of the appropriate transmission channel, such as 105, through the link crosspoints 92.

*The marker*

The marker 60 is provided for the purposes of identifying a request for service, assigning an idle time slot to the calling line requiring service, performing the busy test, assigning an idle time slot to the called line if the called line is idle, and informing the pulse shifter memory 45 of the time slots assigned to the calling and called lines.

Figure 11:
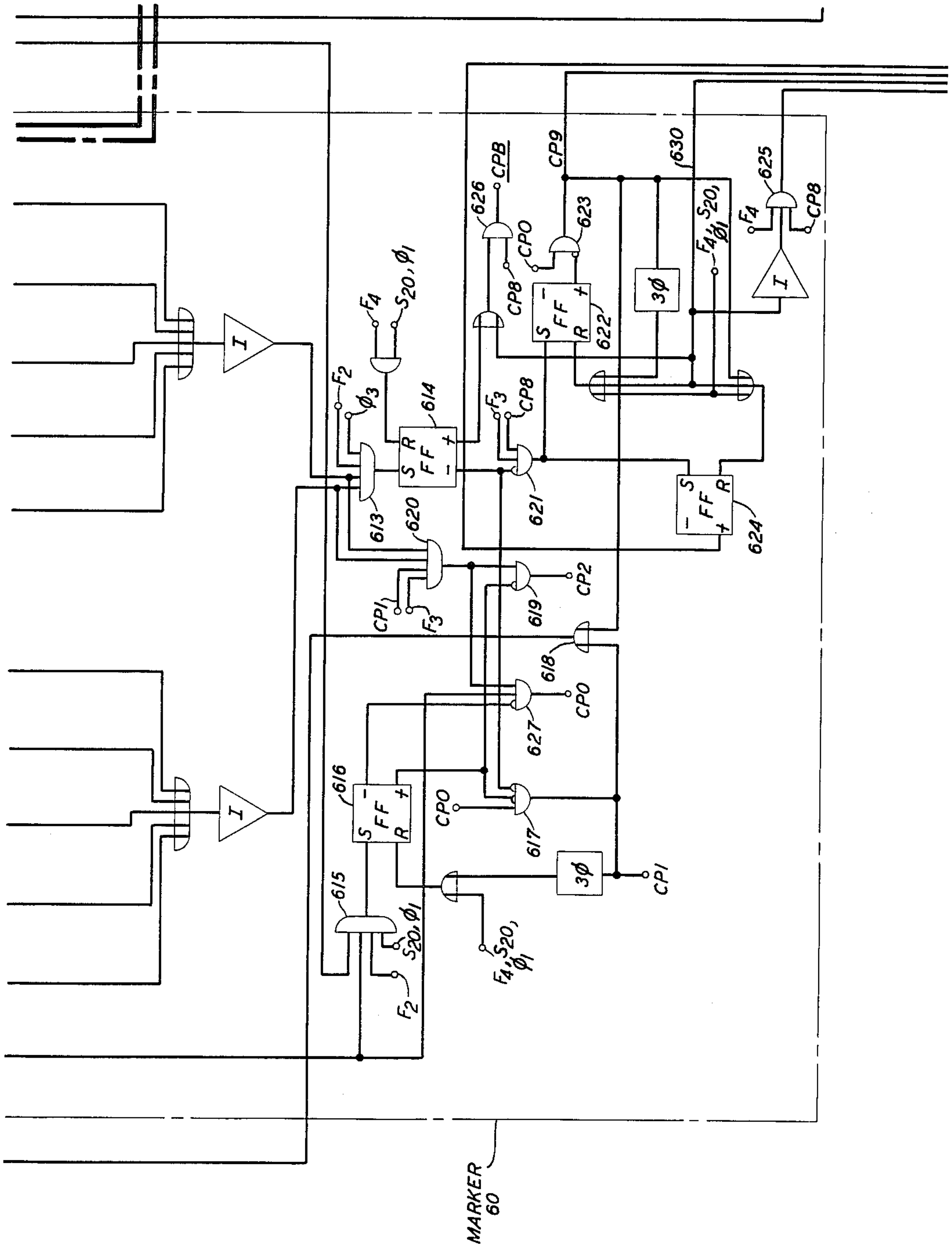

FIGS. 8 and 11 illustrate the schematic diagram of the marker 60. The identity of a calling line presently being scanned by the scanner 32 is received in the marker 60 from the scanner translator 34, FIG. 5, and, in the presence of a signal at AND gates 641–650 from the register 80, FIG. 12, indicating that a called line busy test is not in progress, is applied to the AND gates 601–610. The line number memory 20 also provides inputs to the corresponding AND gates 601–610. Thus if the designation of the line being scanned is not yet written in the line number memory 20, AND gates 601–610 will provide outputs at this time which are inverted and applied in $T_2\varphi_3$ to AND gate 613. Failure of AND gate 613 to provide an output serves to retain flip-flop 614 in its reset state.

AND gate 615, FIG. 11, sets flip-flops 616 in $F_2S_{20}\varphi_1$ in response to an off-hook indication from AND gate 324 in scanner 32, FIG. 3, coupled with the non-busy test signal from register 80. As a result, the next time slot to display the call progress code CP0, signifying the idle state, activates inhibit gate 617 in conjunction with the absence of inhibit inputs from flip-flops 614 or 616 so as to advance the call progress from an idle state, CP0, to a suspect request for service state, CP1. The CP1 output of gate 617 is transmitted to the line number memory 20 through OR gate 618 where it enables AND gates such as 205 to write the calling line number, available from OR gates 631–640, FIG. 8, of the marker 60, in the memory in that particular time slot. Flip-flop 616 is reset by the output of AND gate 617 after a $3\varphi$ delay or by a timing signal $F_4S_{20}\varphi_1$.

When the calling line is scanned in the succeeding five frame scanning interval assigned to it and an off-hook scan result is again observed, flip-flop 616 is set in $F_2S_{20}\varphi_1$, serving to enable inhibit gate 619 so as to advance the call progress of the assigned time slot from state CP1 to state CP2, request for service verified. This is accomplished in conjunction with an output from AND gate 620 which in turn is activated in $F_3$ by a signal reflecting call progress state CP1 together with the calling line designation received through AND gates 601–610.

If a scan result signal indicating off-hook is not received at AND gate 615 at this time, flip-flop 616 remains in the reset state, inhibit gate 627 is enabled, and the call progress of the assigned time slot returns from state CP1 to state CP0, the idle state. In state CP0, the line number in the corresponding time slot is erased from the line number memory 20.

If a line designation is found to be written in the line number memory 20, AND gates 601–610 fail to provide outputs which upon inversion activate AND gate 613 to set flip-flop 614. With flip-flop 614 in the set state, gate 617 is inhibited so that no action is taken to assign an idle time slot to the calling line. In this instance the calling line is understood to be already attended.

The designations of the called line as dialed by the calling line are stored in the register 80. Upon initiation of a busy test, these designations are applied during the time slot assigned to the calling line to the AND gates 601–610 through OR gates 631–640. Calling line designations from the scanner are blocked at this time by the absence of a signal from the busy test circuit at AND gates 641–650. If the called line number is not written in the line number memory 20, AND gates 601–610 are activiated. Thus flip-flop 614 remains in its reset state and inhibit gate 621 is activated in $F_3$ in conjunction with the call progress code CP8, designating the busy test in the calling line's assigned time slot. The call progress of the next idle time slot to appear is then advanced from the idle state CP0 to CP1 and assigned to the called line. This is accomplished when the output of gate 621 sets flip-flop 622, and inhibit gate 623 is enabled to pass the CP0 signal so as to provide the call progress indication CP9, idle time slot assigned called line, to the pulse shifter memory 45, FIG. 14. Also the signal at the output of gate 623 resets flip-flop 622 after a $3\varphi$ delay. This gate 623 provides a single pulse in the time slot now assigned to the called line. This pulse is also transmitted to the line number memory 20 through OR gate 618 to permit storage therein of the called line designation present at the output of OR gates 631–640, in the assigned time slot.

Flip-flop 624 is set by the output of AND gate 621 and reset by the output of AND gate 623, thereby initiating an output signal in the calling line's time slot, which signal is terminated in the called line's time slot. This waveform is transmitted to the pulse shifter memory 45.

A signal at the count of twenty from the pulse shifter memory 45, FIG. 14, corresponding to time slot 20 and received in the marker 60 over lead 630, inhibits AND gate 625 and activates AND gate 626 so as to advance the call progress of the calling subscriber's time slot from CP8, busy test, to CPB, the busy condition. This indicates in this instance that no idle time slot is available for assignment to the called line.

*The supervisory circuit*

Figure 6:
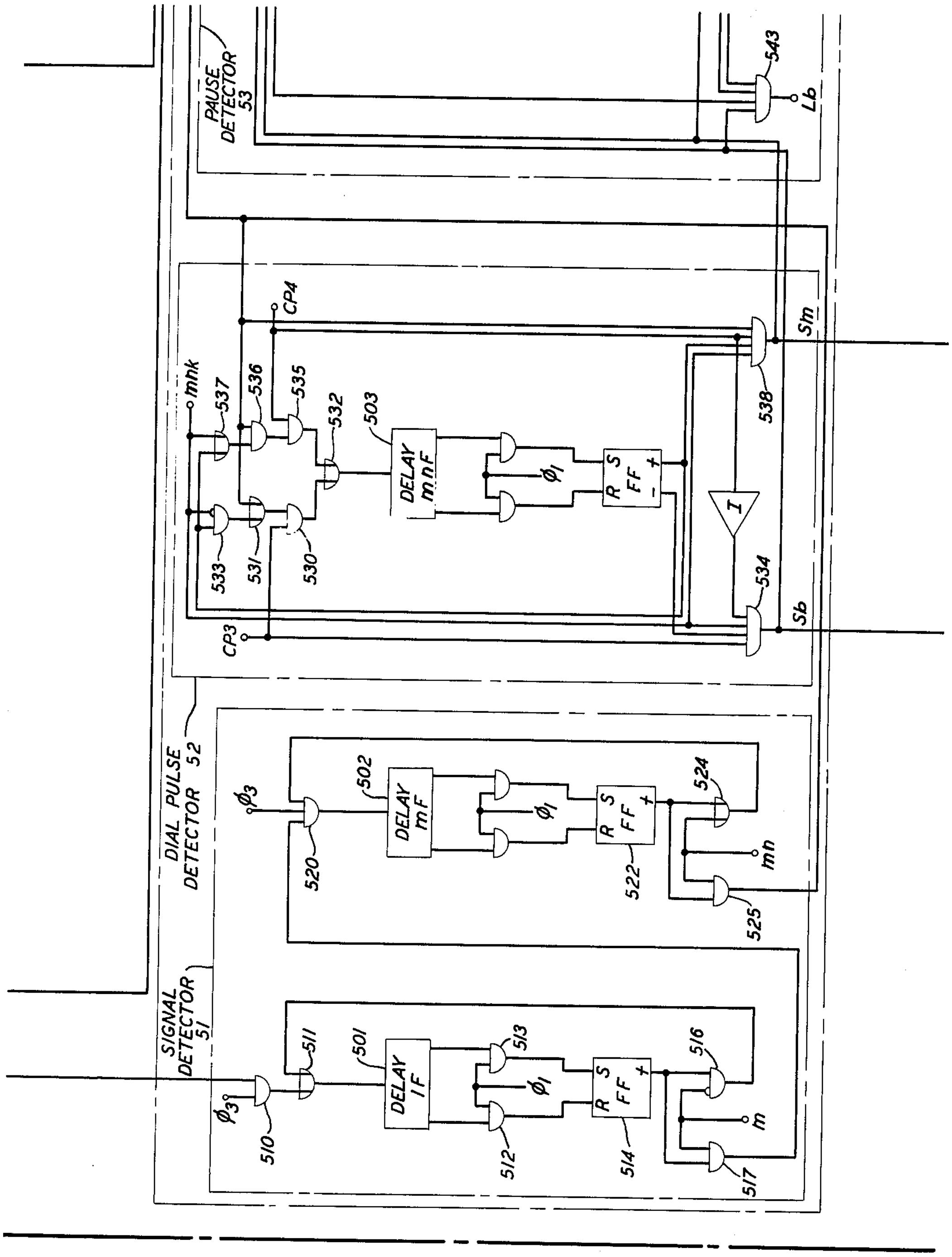

The supervisory circuit 50, FIGS. 6 and 7, detects signals received over the send lead of the common transmission channel 105 and discriminates between speech signals, called line directive signals or dial pulses and the on-hook condition of the calling line. Such signals are produced by the modulator 305 in each line circuit 30, FIG. 3, which is controlled by AND gate 304 to inhibit the normal modulator output pulses during the idle state of the line and during the short intervals in which the line is open during dialing.

The supervisory circuit 50 comprises three delay line detector circuits, the first of which is the signal detector 51 comprising delay lines 501 and 502. The function of the signal detector 51 is to observe each interruption of speech signals. On the average a delta modulated speech pulse will be present on an active line 50 percent of the time. This probability is strengthened by observation of the line for relatively long periods of time. Thus we have found that observation of the channel pulses produced at a given line source for a period greater than one-half the lowest expected speech frequency provides optimum results.

In this illustrative embodiment of the invention the channel pulses in a given time slot are observed for $m$ equals twenty-five successive frames in the circulating delay line 501. Thereafter, a read out pulse with a twenty microseconds duration equivalent to one frame interval is applied to this delay line, thereby providing an output signal if a channel pulse is present in the given time slot in at least one of the preceding twenty-five frames. The second delay line 502 having an $m$ frame delay receives the output of the delay line 501 and provides an output signal of one frame duration every $mn$ equals one hundred frames. The latter output pulses, reflecting the presence of a channel pulse in the given time slot in at least one of the preceding one hundred frames, are then used by circuitry to be described hereinafter to determine the presence of the on-hook condition and dial pulses.

The delay line 501 of the signal detector 51 is arranged so as to detect the continual absence of speech pulses on the transmission channel 105. Thus AND gate 510 will deliver channel pulses to delay line 501 through OR gate 511 in $\varphi_3$ of each time slot. After a delay of one frame interval, the content of a particular time slot will be read out of delay line 501 in $\varphi_1$ through one of AND gates 512 and 513 into flip-flop 514. If a channel pulse is present, the flip-flop 514 is activated so as to present an input signal at inhibit gate 516. Gate 516 is inhibited by the read out pulse every $m$ equals twenty-five frames. In the interim between read out pulses, any channel signal stored in this time slot is recirculated. The read out pulse serves to inhibit recirculation of channel signals in the delay line 501 after the $m$ frame interval preparatory to a new cycle of operation. The read out pulse, while inhibiting reentry of the circulating signals in the delay line 501, also activates AND gate 517 to apply a signal to the next delay line 502 only if a channel pulse was detected on the send lead of the transmission channel 105 in a given time slot in at least one of the preceding twenty-five frames.

Delay line 502 of the signal detector 51 is arranged particularly to detect the presence of a speech pulse in a particular time slot during $n$ equals four successive $m$ frame intervals. To perform this function, AND gate 520 delivers a signal to the delay line 502 upon the coincident receipt of an output of delay line 501 at $m$ frame intervals, the $\varphi_3$ signal in each time slot, and a frame signal in each $mn$ frame. The signal, if any, is then delayed for $m$ frames in delay line 502 and applied through OR gate 524 to AND gate 520. An output of delay line 502 from the set side of flip-flop 522 indicates the presence of a speech signal during the predetermined interval, while absence of an output from the set side of flip-flop 522 indicates that no speech signal was present during this interval. In the former case, the output activates AND gate 525 in conjunction with the *mn* frame signal to provide a signal to the dial pulse detector 52 of the supervisory circuit 50.

In order to distinguish the presence or absence of dial pulses, it is necessary for the dial pulse detector 52 to observe continual connection or disconnection of the line for prescribed intervals. According to current dialing practice, the dial springs are closed and the line circuit completed for thirty-three milliseconds; the dial springs are open, thus opening the line, for sixty-seven milliseconds and the minimum pause between successively dialed digits is one hundred and sixty milliseconds. The interval of observation by the supervisory circuit 50 under these conditions should be less than one-half of the thirty-three millisecond interval that the dial springs are closed. In this illustrative embodiment of the invention, the interval is chosen as ten milliseconds; i.e., *mnk* equals five hundred frames or five successive outputs of the signal detector delay line 502 appearing at one hundred frame or two millisecond intervals.

Since the continual connection and disconnection of the line during the dialing process are not observed simultaneously, one delay line 503 in the dial pulse detector advantageously is utilized for both operations by employment of appropriate call progress codes. Thus the circuit is arranged such that it normally looks for continual disconnection of the line or dial break, and if the dial break condition is detected; viz., complete absence of channel pulses during the detection interval, the call progress memory is instructed to apply the call progress code CP4 to convert the dial pulse detector 52 for observation of continual connection of the line in succeeding frames. Similarly, if a continual connection of the line is detected during the prescribed ten millisecond observation interval, the call progress memory will apply CP3 to switch the circuit back to its condition for observation of the continual disconnection or dial break condition in succeeding frames.

The delay line 503 in the dial pulse detector 52 has a delay equivalent to five hundred frame intervals or ten milliseconds. The dial pulse detector 52 is first prepared to detect the disconnect condition or dial break during dial pulsing. For this purpose call progress code CP3 is applied to AND gate 530 during the observation period. Channel pulses, if present, produce an output from the signal detector 51 at one hundred frame or two millisecond intervals. Such output signals, indicating an off-hook or dial make condition, are received in OR gate 531 and, if present during the dial break observation period, are transmitted through AND gate 530 and OR gate 532 to delay line 503. Thereupon such connection signals are delayed for one hundred frames or two milliseconds and are applied through inhibit gate 533 to the same delay line input circuit.

The signal detector 51 is observed for a ten millisecond interval *mnk* equivalent to five hundred frames or sufficient time to observe five successive outputs. Thus connection signals are recirculated through the delay line 503 five times, after which a control signal *mnk* is applied to AND gates 534 and 538, together with a signal from the delay line 503 indicating the presence or absence of any connection signals therein. If the connection signal is absent, AND gate 534, receiving the delay line output, the *mnk* control signal and CP3, will provide an output signal indicating that the dial break was in fact observed. The dial break observation period terminates with the application of the *mnk* control pulse to inhibit gate 533. Such action inhibits the recirculation of any signal present in the delay line 503 during the previous observation interval.

An output signal from AND gate 534 at this time will cause the call progress memory 90 to change the operation from dial break observation to dial make observation, in which case the call progress code CP4 is applied to AND gate 535 and the CP3 signal previously applied to AND gate 530 is removed. Dial make observation continues for a like period as the dial break observation; viz., ten milliseconds or five hundred frames, equivalent to the period necessary for the observation of five connection signal outputs of the signal detector portion of the supervisory circuit 50. These connection signals are now received at AND gate 536, which provides an output upon receipt of such a connection signal together with the next *mnk* control signal.

If a connect signal is in fact present, it is transmitted upon receipt of call progress code CP4 through AND gate 535 and OR gate 532 to the delay line 503. It is again delayed for *mn*, the two millisecond or one hundred frame interval between connection signal outputs of the signal detector 51. It is then transmitted through OR gate 537 to AND gate 536 and recirculated in the delay line 503 only if another connect signal is present at the input from the signal detector 51 at this time.

If the end of five successive observations of the connection signal output a signal is present in the delay line 503, it will be transmitted through AND gate 538 upon receipt of the next *mnk* control signal thereat, indicating termination of the dial make observation period.

An output from AND gate 538 at this time indicates that the continual connection or dial make interval of dial pulsing was in fact observed. The call progress memory 90 thereupon reverts to CP3 at the appropriate time to permit the dial pulse detector 52 to perform another disconnect or dial break observation. Such operations will continue alternatively until dial pulsing is interrupted by the pause between the dialing of successive digits.

Continual connection of the line for longer periods of time than experienced during dial pulsing indicate the off-hook condition or the pause between the dialing of successive digits. The continuous connection output of the signal detector 51 and the dial make output of the dial pulse detector 52 are utilized in the pause detector 53, comprising a single delay line 504, to determine these conditions. Thus the output of the signal detector 51, indicating the presence of a channel signal on the line during the previous two milliseconds or one hundred frames, is applied to AND gate 540, together with the dial break output of the dial pulse detector 52. The presence of this combination indicates that dialing is still in progress, a dial break was just detected, and a dial make condition is presently being detected. The resultant signal is circulated through the delay line 504, a reentry path being provided through inhibit gate 541, for 160 milliseconds or *mnkl* equals 8,000 frames, the interval required to indicate a long break or long make condition.

A signal may also be circulated through delay line 504 as the result of a distinct combination of inputs to AND gate 542. This combination includes the absence of a signal detector 51 output following the dial make interval, as reflected by the dial make output of detector 52, which indicates that a dial break condition is being observed.

The absence of a signal circulating through delay line 504 is detected at the end of the 160 millisecond interval at AND gates 543 and 544. If a signal is still absent after the allotted dial break period, an output signal is provided by AND gate 543, indicative of the long break or on-hook condition. If detected on a priorly active line while in call progress state CP2–7, 13 or CPB, it will be utilized to restore the call progress state to CP0, the idle state.

Similarly, if after detection of the dial make condition, a connect signal is present for the prescribed *mnkl* period of 8,000 frames or 160 milliseconds, no signal will be circulating in the delay line 504, and an output will be provided by AND gate 544, indicative of the long make condition or pause between dialed digits when detected during the dialing operation. This unique arrangement of circuitry in the pause detector 53, utilizing outputs of the signal detector 51 and dial pulse detector 52, permits an economy of components over an arrangement following that prescribed for the other two detector circuits.

*Supervisory register*

Figure 9:
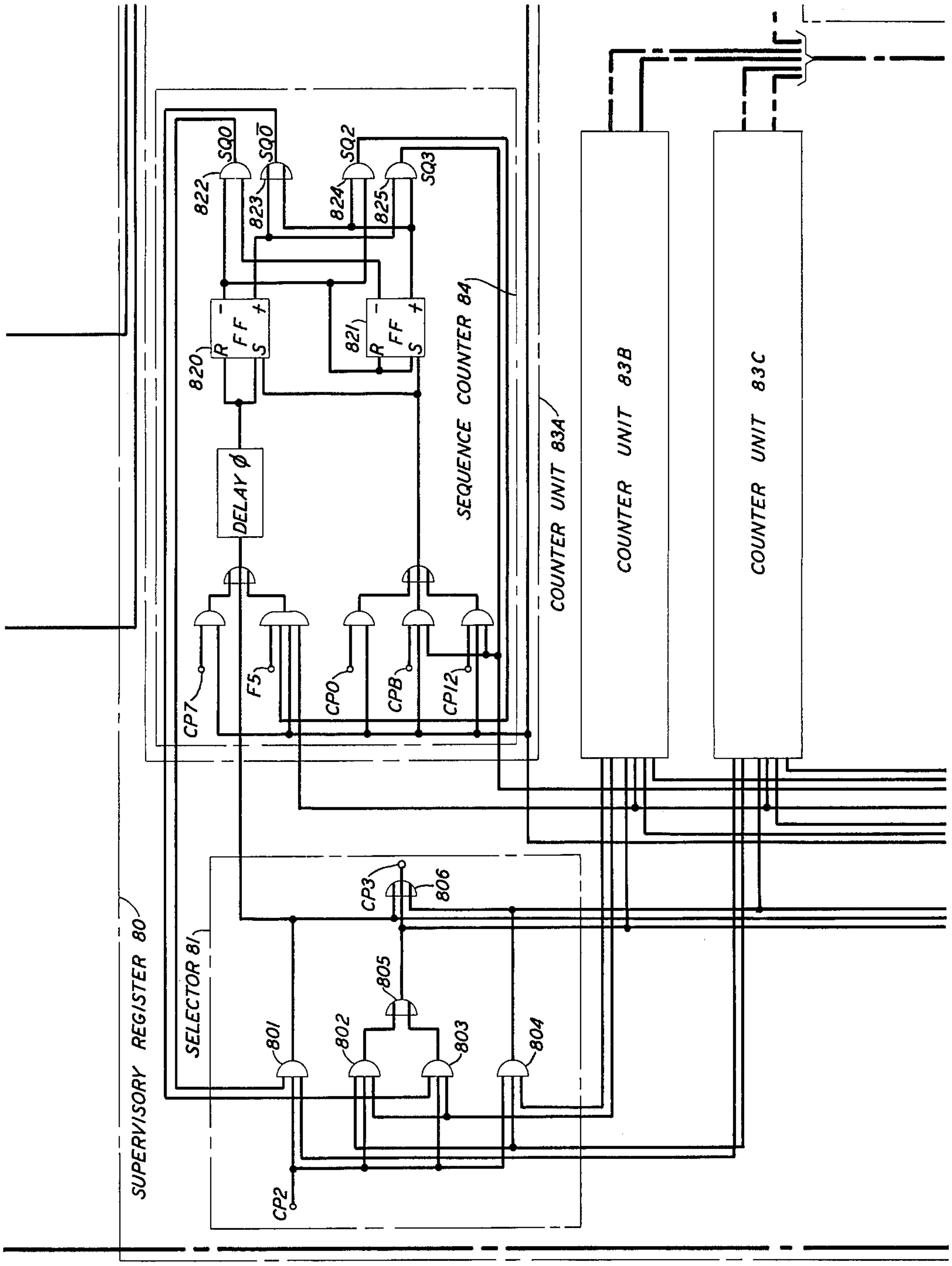
Figure 10:
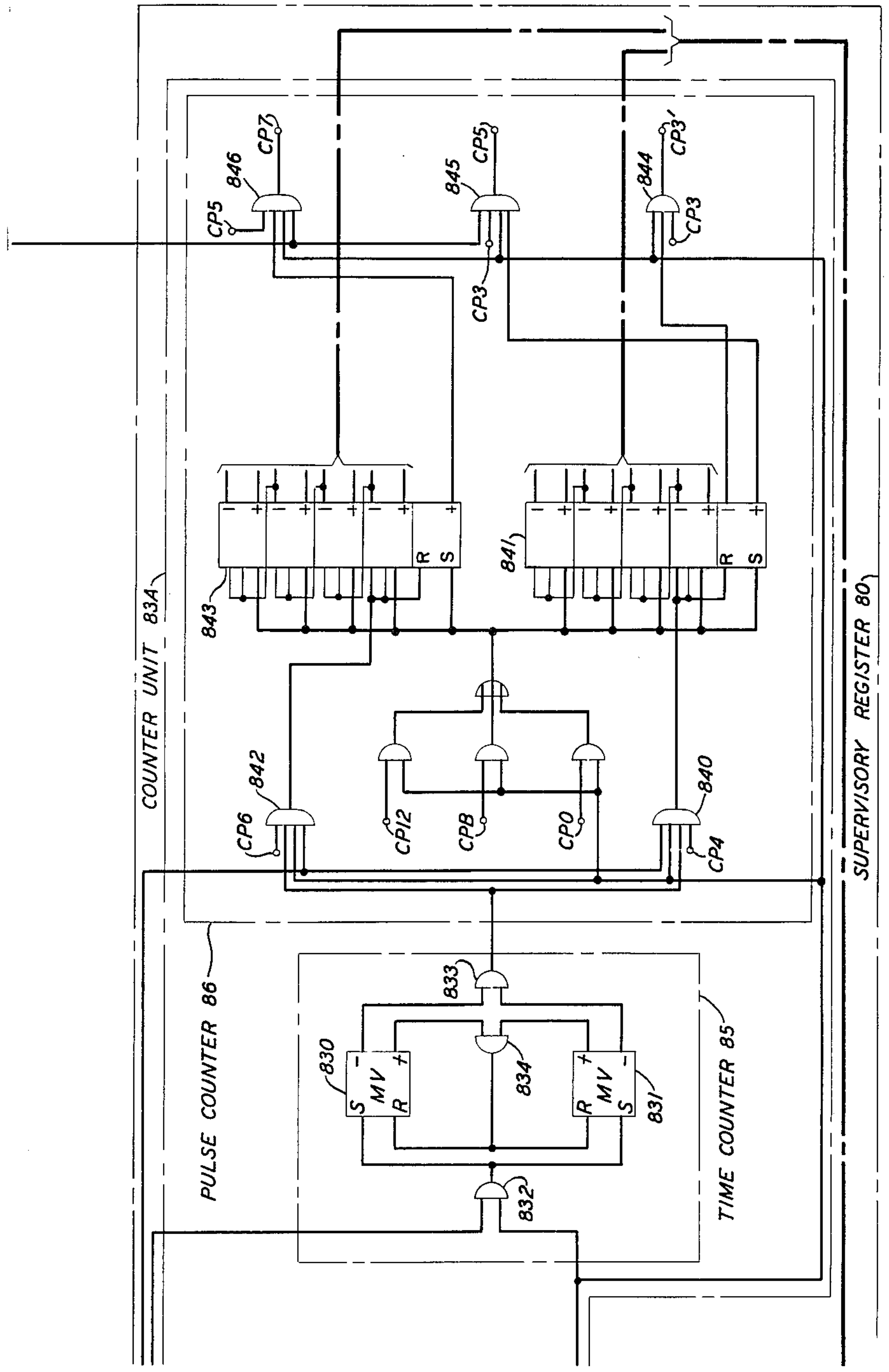
Figure 12:
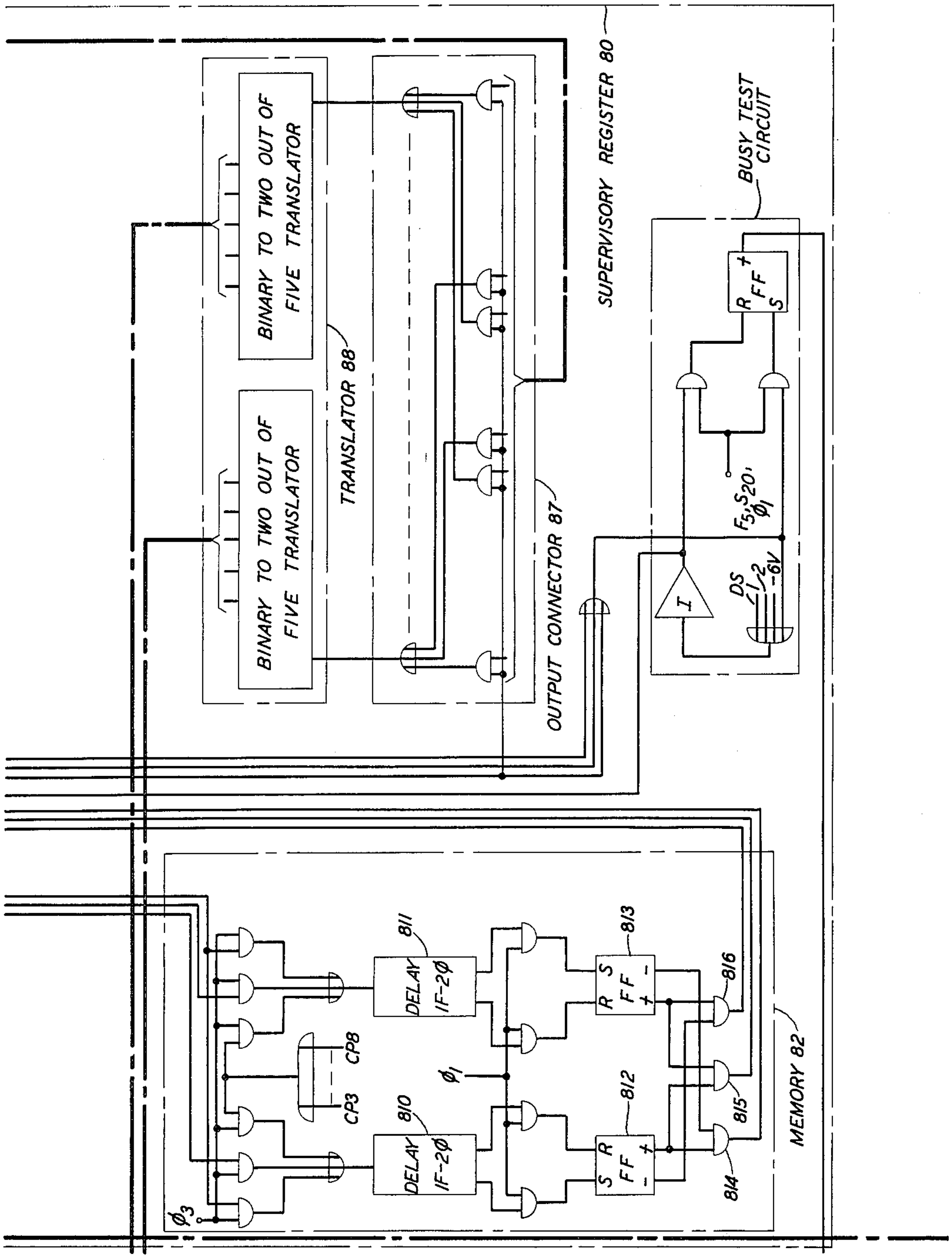
Figure 13:
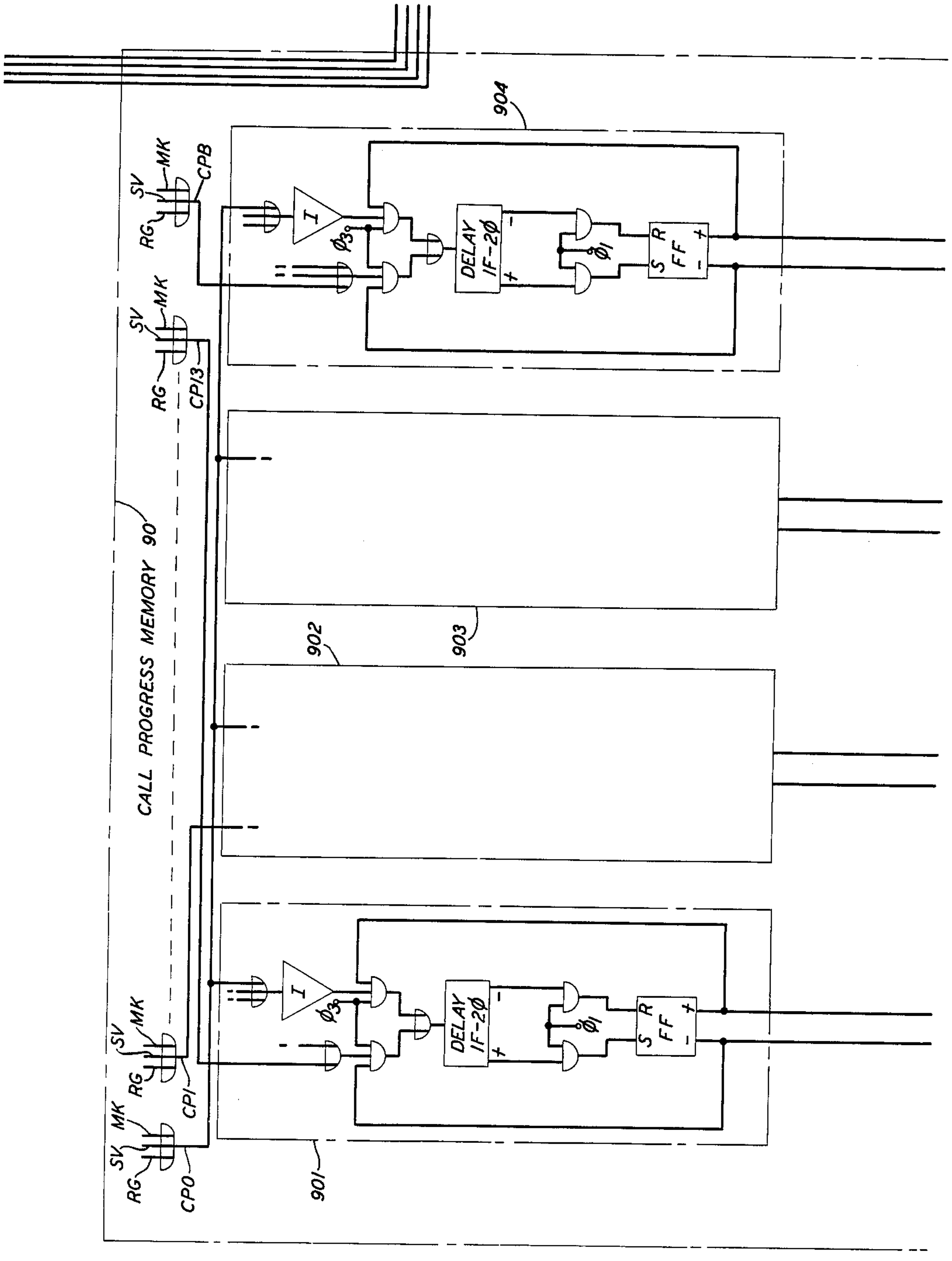

The supervisory register 80, as illustrated in FIGS. 9, 10 and 12, serves to distinguish between the various output signals provided by the supervisory circuit 50 and to store and translate the dial pulses. In this specific illustrative embodiment serving 100 telephone lines, three register counter units are sufficient for the recording of dial information to satisfy the normal calling rate for such a system. Of course the number of counter units will increase in proportion to the size of the system to be served and the traffic requirements of that system. Thus, the supervisory register comprises the register selector 81, the register memory 82 and the register counter units 83A, 83B and 83C, each of the counter units consisting of three distinct counters such as sequence counter 84, time counter 85 and pulse counter 86 in counter unit 83A. The information provided by the counter units is directed through the register output connector 87 and translator 88 to the marker 60.

When a request for service on one of the subscriber lines is verified, the register selector 81 searches for an idle one of the register counter units 83A, 83B or 83C. Each of the three counter units employed in the instant embodiment may be allotted to the calling subscriber lines in sequence, in a random order, or in a predetermined order. The register selector 81 in the instant arrangement makes the selection of the counter units in accordance with a predetermined order which we have found to provide optimum results with respect to equalization of the traffic load and counter assignment in a minimum time. Thus the AND gates 801–804 and the OR gates 805 and 806 are arranged in such a way that counter unit 83A will be assigned to a calling line when counter unit 83C is busy, regardless of the state of counter unit 83B. Counter unit 83B will be assigned to a calling line requesting service when counter unit 83C is idle, regardless of the state of counter unit 83A or when counter units 83A and 83C are both busy. Similarly, counter unit 83C will be assigned to the line requesting service when counter unit 83B is busy, regardless of the state of counter unit 83A.

Two inputs to each of the AND gates 801–804 indicate the busy or idle condition of each of the counter units 83A through 83C. A third input of the AND gates 801–804 provides the call progress code CP2, indicating that a request for service has been received on one of the subscriber lines.

The register selector 81 provides output signals in the calling subscriber's time slot which serve to seize the appropriate one of the counter units 83A–83C, and at the same time the call progress code is changed to CP3 by the output of OR gate 806 to indicate that the system is now ready to receive dialed digits.

The register memory 82 comprises two magnetostrictive delay lines 810 and 811 and associated logic circuitry for the storage and circulation in a corresponding time slot of the particular counter unit assigned to a calling line. This counter unit designation is retained in the register memory and read out in the appropriate time slot of each cycle so long as the call progress code of the particular time slot is CP3 (ready for dialing), CP4 (dial pulse, first digit), CP5 (minimum pause), CP6 (dial pulse, second digit), CP7 (dialing completed) or CP8 (busy test).

The outputs of the delay lines 810 and 811 are recorded in the flip-flops 812 and 813, respectively, in each time slot and transmitted to the appropriate counter unit 83A–83C through AND gates 814, 815 and 816. The arrangement at the output of the register memory 82 is such that counter unit 83C will be activated when a signal is present in one time slot in delay line 810 and no signal is present in the same time slot in delay line 811, thereby activating AND gate 814 in that time slot. Similarly, AND gate 815 provides an output to activate counter unit 83B when in a particular time slot both delay lines 810 and 811 contain a signal. Finally, AND gate 816 provides an output to activate counter unit 83A when, in a given time slot, delay line 810 does not contain a signal and delay line 811 does contain a signal.

Each of the register counter units contains three counters. For illustration, the counters in unit 83A are shown in detail, the counters in the other two units being of the same type. The sequence counter 84 consists of two flip-flops 820 and 821 which store the current state of the counter unit in a particular sequence; viz., idle, dialing in progress, request for translation, and busy test. The particular designations are stored in this sequence and upon completion of the busy test, the sequence restores to the idle state and is repeated when the call progress indicates that the called line is busy, or that the connection is established for talking. The arrangement of logic circuitry is such that the particular desired one of the states is indicated at the output of AND gates 822–825.

The time counter 85, FIG. 10, consists of two monostable multivibrators 830 and 831 which generate output signals of different durations upon the arrival of the dial break signal from the supervisory circuit 50 at AND gate 832, together with the appropriate request for service signal from the register memory 82. The resultant output signals have a duration sufficient to identify the presence of a dial pulse when combined in AND gate 833. Thus if an output signal is produced in the interval between specified minimum and maximum limits, the time counter 85 will have identified the dial pulse. If the output is present only during the interval less than the minimum limit, the counter recognizes the presence of an error signal on the line, known as a hit. In this situation the output of AND gate 832 is removed prematurely, and the time counter 85 is reset by an output of AND gate 834 applied to the inputs of multivibrators 830 and 831. Such a condition will arise when the dial make signal is received from the supervisory circuit 50 in a time less than the minimum limit after receipt of the dial break signal.

Similarly, if the interval between receipt in the time counter 85 of the dial break signal and appearance of the dial make signal is greater than the maximum limit, the pause between dialed digits or the end of dialing is indicated. This condition will be reflected in the output of AND gate 833 by a third signal in the interval beyond the maximum limit.

The pulse counter 86 receives the output of the time counter 85 in AND gate 840, together with the dial make indication from the supervisory circuit 50, the call progress word CP4 (dial pulse, first digit) and the service request signal from memory 82. If the signal received from the time counter 85 is the output representing the dial pulse, AND gate 840 will be activated to transmit a signal to binary counter 841 consisting of a series of flip-flop circuits and associated gates for the registration of a four-digit binary number. In this fashion the first dial pulse of the first digit is stored.

Successive dial pulses are transmitted to the binary counter 841 until the pause between dialed digits is recognized. The call progress word then is changed to CP6 (dial pulse, second digit) which serves to activate AND gate 842 upon receipt of subsequent dial pulses. This in turn activates binary counter 843 to store the dial pulses and produce the binary number indication of the second dialed digit.

If the pulse counter 86 fails to accept a dial pulse signal from the time counter 85 during CP4 or CP6, an additional flip-flop in each of the binary counters 841 and 843 will reflect this condition by remaining in the reset state. If this situation is present in CP3 (ready for dialing) while this particular counter unit is busy, as well as the other counter units, the signaling and tone system 70 receives a signal from AND gate 844 directing it to provide dial tone to the calling line.

When an input is accepted by the binary counter 841, the additional flip-flop will be set. If at the same time the long make signal is received at AND gate 845 together with CP3, AND gate 845 will provide an output serving to advance the call progress from CP4 (dial pulse, first digit) to CP5 (minimum pause) indicative of the pause between dialed digits.

Similarly, AND gate 846 will be activated upon receipt of the long make signal, the reset signal from the extra flip-flop in binary counter 843 and CP5 (minimum pause). An output from AND gate 846 serves to advance the call progress from CP6 (dial pulse, second digit) to CP7 (dialing completed).

The binary counters 841 and 843 are reset when the call progress is at CP0 (idle), CPB (busy) or CP12 (talking connection completed).

The register output connector 87 comprises a series of AND and OR gates for connecting the counter units 83A–83C, conducting the busy test, to the register translator 88, which in turn consists of logic elements in a binary to two-out-of-five arrangement, as known in the art.

In operation the register selector 81 receives the verified request for service and assigns an idle one of the counter units 83A–83C. The call progress advances to CP3 (ready for dialing) and the sequence counter 84 in the selected counter unit advances to the dialing position. The tone system 70 is alerted to provide the dial tone to the calling subscriber, whereupon the supervisory circuit 50 detects the continual absence of speech pulses for predetermined intervals and transmits the distinct dial break signal to the time counter 85 of the selected counter unit. The call progress now becomes CP4 (dial pulse, first digit) and the time counter 85 is triggered by the dial break signal. Subsequently the supervisory circuit 50 provides the distinct dial make signal to the time counter 85, whereupon the time counter identifies the interval between receipt of the dial break and dial make signals.

If the interval falls within the prescribed limits, the time counter 85 will provide an indication that a dial pulse has been received, which indication is stored in the pulse counter 86 of the selected counter unit. During the succession of dial pulses for the first dialed digit, the call progress code alternates between CP3 (ready for dialing) and CP4 (dial pulse, first digit). A continual make signal for longer than the prescribed maximum limit following a series of dial pulses is recognized as the pause between dialed digits and causes the pulse counter 86 to provide an output signal advancing the call progress to CP5 (minimum pause).

The next dial break signal received from the supervisory circuit 50 will result in a change of the call progress to CP6 (dial pulse, second digit). During receipt of the succeeding dial pulses of the second digit, the call progress code will alternate between CP5 and CP6. Receipt of the long make signal succeeding the second dialed digit is identified as completion of the dialing operation and the call progress code is advanced to CP7 (dialing completed). At the same time the sequence of the sequence counter 84 in the selected counter unit advances to the state in which a request is made for a translation.

If the register output connector 87 and translator 88 are idle, the sequence counter 84 will be advanced to the busy test state and the call progress code changed to CP8 (busy test). The called line designation which is currently stored in the pulse counter of the selected counter unit as two digits in binary code decimal form is transmitted through the register output connector 87 to the translator 88 where it is converted into an appropriate two-out-of-five code and forwarded to the marker 60.

Subsequent operations will determine the next call progress code to be CPB (busy) or CP12 (talking connection completed) in either of which cases the register 80 is restored to its original state.

*Normal call*

The operation of the system in establishing a connection between calling and called lines located in the same concentrator will now be described with particular reference to the flow chart of FIG. 19. Subscriber 110, FIG. 3, desires to place a call to subscriber 112 and initiates the system operation by taking the telephone off-hook. The scanner 32, connected to the hybrid coil 301 in the line circuit 30 of the calling line, signals the off-hook condition appearing as a voltage drop in the line circuit to the matrix at the input of the first digit gate in the scanner 32.

Each line in the concentrator 101 is scanned during consecutive five frame intervals. Thus at the beginning of a particular five frame interval, the first and second digit selectors 320 and 321 respectively, FIG. 5, are set so as to reflect the particular designation of the calling line 110, and this line will be observed for five successive frames.

The scanner 32 will provide the off-hook indication for the line currently being scanned to the marker 60, FIG. 11. This indication, coupled with a designation of the calling line provided by the scanner translator 34, initiates action in the marker 60 to assign the calling line to a particular time slot and to register the calling line designation in the assigned time slot in the line number memory 20, where it will be circulated for the duration of the call. In the process the marker 60 changes the call progress code CP0, indicating an idle time slot, to CP1, the state in which the scanned line is off-hook and no information for the scanned line was previously stored in the line number memory. Thus the central office now suspects that the subscriber 110 is requesting service, and it verifies this situation in the next scanning interval of five frames in which this particular line is scanned. The condition reflected during the latter scanning interval is the continuation of the off-hook condition plus registration of the calling line designation in the line number memory 20.

With this situation prevailing, the marker 60 advances the call progress to CP2, the state in which the scan result on the calling line again reveals the off-hook condition. The progress of the call may be observed by reference to the sequence and state diagram, FIG. 19. The CP2 indication is transmitted to the supervisory register 80, in which an idle counter unit 83 is assigned. When and if such a unit is available, the call progress advances to CP3, the state in which an idle register is assigned, and the circuit is ready to receive dial pulses from the calling line.

The signalling and tone system 70, in response to receipt of the CP3 signal, transmits dial tone over the receive lead of the transmission channel 105 to the line circuit 30, where it is combined with the designation of the calling line provided by the line number memory 20 in the assigned time slot and delivered to the subset 110. Upon hearing dial tone, the calling party begins dialing the directory number of the called line 112. The changes in the line condition caused by the dial operation permit signals to be transmitted through the modulator 305 in the line circuit 30 and over the send lead of the transmission channel 105 to the signal detector 51 of the supervisory circuit 50.

At each dial break, the call progress advances to CP4, and at each dial make, the call progress returns to CP3. Thus a dial pulse is suspected by the transition from CP3 to CP4 and is verified by the following transition from CP4 to CP3. The longer interval between successive dialed digits is thereupon detected by the pause detector 53 in the supervisory circuit 50 and the call progress advanced to CP5. The pulse counter 86 stores the individual dial pulses for each dialed digit, the call progress changing between CP5 and CP6 during registration of the second dialed digit. When the supervisory circuit 50 detects the line condition in which dial pulses are absent for a longer time, indicating that dialing has been completed, the call progress advances to CP7 by action of the pause detector 53 in conjunction with the assigned counter unit 83, FIG. 10, of the supervisory circuit 80. CP7 signifies that dialing is completed.

Having completed the storage of the dialed digits identifying the called line, the operation advances to CP8 in order to conduct a busy test of the called line. For this purpose the dialed digits stored in the counter unit 83, FIG. 10, of the supervisory register 80 are transmitted through the output connector 87 and translator 88, FIG. 12, to the marker 60, FIG. 8, to perform the busy test. The designation of the called line is compared with the information stored in the line number memory 20, FIG. 8, and if such comparison reveals that the called line is not stored therein, the marker 60 proceeds to assign a time slot to the called line and stores the called line designation in the line number memory 20. The marker 60 thus has available indications of the time slots assigned to the calling and called lines, at which point the call progress is advanced to CP12 in the time slot assigned to the calling line, designating establishment of the connection for talking, while the call progress in the time slot assigned to the called line is advanced to CP9, the state in which an idle time slot is assigned to the called line. An indication of this call progress state, plus the indications of the time slots assigned to the calling and called lines and the time interval therebetween, is applied by the marker 60 to the pulse shifter memory 45, FIG. 14.

Having stored this information in its circulating delay lines, the pulse shifter memory is prepared to activate the pulse shifter 40 in successive frames while the connection between the calling and called lines is inactive. It does so by activating the output gates of the tapped delay line in the appropriate time slot assigned to each of the calling and called lines. Having assigned an idle time slot to the called line, a CP9 indication activates the signaling and tone system 70 to provide ringing tone to the called line via the link crosspoints 92 and the receive lead of the transmission channel 105. Also in the time slot assigned to the called line, the signaling and tone system 70 provides the same tone to the send lead of the transmission channel 105 through the tapped delay line of the pulse shifter 40, the link crosspoints 92, the receive gate 71, the receive lead of the transmission channel 105, to the subset 110 such that the calling party hears the same tone in the time slot assigned to his line as the called party hears in the time slot assigned to the called line.

The supervisory circuit 50, FIGS. 6 and 7, now observes the status of the called line in its assigned time slot, and when the pause detector 53 detects the minimum pause corresponding to the off-hook condition of the called line, the call progress is advanced to CP11. If the condition is repeated for a like interval in succeeding frames, the call progress advances to CP12 in the time slot assigned to the called line. With the appearance of CP12, the control circuits including the marker 60, supervisory 50, and supervisory register 80 are restored to normal, and voice transmission on the active connection is maintained by the calling and called line designations stored in the line number memory, as applied in their respective time slots, to the line circuits. Also the pulse shifter 40 and its memory 45 maintain the appropriate transposition of information between the time slots assigned to the calling and called lines.

The supervisory circuit 50 continues to monitor the active connection such that when the connection is broken by the calling or called party, the channel signal will be absent for the predetermined long break interval, and the pause detector 53 will provide an output from AND gate 543, FIG. 6. This signal is transmitted to the call progress memory 90 to alter the call progress from CP12, the active line condition, to CP13, the state in which the connection has been broken for a predetermined interval. The disconnect condition is verified by once again observing the time slots assigned to the calling and called lines for a period of time equivalent to the long break interval previously observed. If the pause detector 53 again provides the long break output, the call progress is advanced from CP13, the condition in which a disconnect is suspected, to CP0, the idle state.

The presence of the CP0 state in the time slots assigned to the calling and called lines will cause erasure of the designations for those lines from the line number memory 20. Also the particular pulse shift information between the assigned time slots stored in the memory 45 is erased. Thus all of the central office equipment pertaining to this particular call has been restored to normal.

*Called line busy*

If in the processing of the connection of a calling line to a called line it is determined during the busy test conducted in CP8 of the call progress that the called line designation is already contained in the line number memory 20, indicative of a busy line, the marker 60 will detect this condition at AND gate 626, FIG. 11, and change the call progress to CPB, the state in which the called line is busy or no time slot is available for assignment to the called line. In the latter case the marker 60 finds that the called line is idle, but in hunting for an idle time slot for assignment to the called line, it finds that all time slots are occupied on other calls, as reflected by the pulse shifter memory 45, so that the marker 60 again provides the CPB output from its AND gate 626.

With the call progress in state CPB, the signaling and tone system 70 is activated to provide the busy tone to the calling line in its assigned time slot through the link crosspoints 92, the receive gate 71 and the receive lead of the transmission channel 105.

The supervisory circuit 50 again monitors the calling line and, upon detection of the long break condition, signifying that the calling party has hung up, the call progress memory 90 will be alerted to alter the call progress state in this time slot to CP0 in preparation for a new assignment.

It may be noted in general with regard to the call progress in the system that regardless of the various manners in which a call may be established or disestablished, the particular call progress codes, FIG. 19, other than restoration to the idle condition, are changed by one digit only as they advance from one state to the next state. Such a unique arrangement permits simplicity and economy of design in the common control circuitry for generating and providing the call progress signals to the various components which utilize them.

It is to be understood that the above-described arrangements are merely illustrative of the application of the principles of the invention. Numerous other arrangements may be devised by those skilled in the art without departing from the spirit and scope of the invention.

What is claimed is:

1. A communication system comprising a plurality of lines including active lines communicating in pairs, a common transmission channel, switching means for connecting said active lines to said channel in distinct time slots of a repetitive cycle, delay means connected to said channel to receive such samples and supervisory indications from a calling one of said active lines in a first time slot, means for registering outputs of said delay means in distinct recurring intervals to discriminate between said speech samples and supervisory indications provided by said first line, means connected to said registering means for receiving the registered supervisory indications designating a called line and for assigning a second time slot in the recurrent cycle to said called line, and means for transposing information between the distinct time slots assigned to said calling and called lines in communication, said last-mentioned means comprising a delay element connected to said channel to receive information from one of said calling and called lines in the corresponding time slot, and means for applying an output of said delay element taken in the time slot assigned to the other one of said first and second lines to said channel to transmit the information to said other line.

2. A time division communication system comprising a plurality of lines, a distinct gate terminating each of said lines, a transmission channel having first and second leads for transmission of information in opposite directions between pairs of said lines in communication as well as supervisory indications necessary to the establishment and disestablishment of the connections between said pairs of lines, means for applying information and supervisory indications provided by one of said lines through the corresponding one of said line gates to said first lead of the transmission channel in a distinct time slot of a recurring cycle of time slots, said distinct time slot being assigned only to said one line while active, and means connected to said first lead for distinguishing between said information and supervisory indications transmitted in said distinct time slot in successive cycles.

3. A time division communication system in accordance with claim 2 and further comprising means for detecting requests for service by said lines in a time slot of each cycle reserved for supervision, and means for providing a distinct designation of each of the lines requesting service.

4. A time division communication system according to claim 3 wherein said detecting means comprises a gate circuit, a plurality of scanning leads each connected between a corresponding one of said plurality of lines and said gate circuit, and wherein said designation means comprises a multistage counter circuit having an output from each stage connected to said gate circuit, the coincident receipt of a particular line designation and a request for service signal on the scanning lead connected to the designated line enabling said gate circuit to provide a request indication.

5. A time division communication system according to claim 3 and further comprising memory means storing designations of active lines in corresponding assigned time slots and a marking circuit comprising means for comparing the designation of a line requesting service with the designations stored in said memory means, means responsive to said comparison for assigning an idle time slot to a requesting line, and means for storing the designation of the requesting line in said memory means in the assigned time slot.

6. A time division communication system according to claim 5 wherein said memory means comprises a plurality of delay means, means for gating one digit of the plural digit line designation to each of said delay means in the time slot assigned to the active line, means for circulating the stored digits through the corresponding delay means once in each cycle of time slots, and means for applying the outputs of a distinct combination of said delay means to a corresponding one of said lines.

7. A time division communication system according to claim 5 wherein said distinguishing means comprises delay means receiving signals from said first lead and providing a plurality of outputs after corresponding distinct delay intervals indicative of dialed pulses, the interval between dialed digits, the off-hook and the on-hook conditions, means for timing the intervals of observation, means for storing the sequence of observation intervals, and register means operative under control of said timing and storing means to register the dialed digits as indicated by the outputs of said delay means.

8. A time division communication system according to claim 7 and further comprising means for applying the registered digits designating a called line to said marking circuit, said marking circuit further comprising means for comparing the called line designation with the designations stored in said memory means, means responsive to said comparison for assigning an idle time slot to said called line, and means for storing the designation of the called line in said memory means in the assigned time slot.

9. A time division communication system according to claim 5 wherein each of said lines comprises a source of information and supervisory indications, gating means connected to said source and to said memory means for providing a carrier signal upon coincident receipt of the line designation from said memory means and an indication from said source that said line is active, and means connected to said first lead of said transmission channel for modulating said carrier signal with said information and supervisory indications.

10. A time division communication system according to claim 5 and further comprising delay means connected to said first lead of said transmission channel for receiving information from a first one of a pair of said lines in communication in the time slot assigned to said first line, and means for selectively connecting one of a plurality of output terminals of said delay means to said second lead in the time slot assigned to the second one of the pair of said lines in communication for transmitting the information to said second line.

11. A time division communication system according to claim 10 wherein said connecting means comprises a plurality of counter and storage devices activated by said marking circuit to record the number of time slots intermediate the time slots assigned to said first and second lines.

12. A time division communication system according to claim 10 and further comprising distinct sources of ringing, busy and dial tones, means connected to said tone sources for translating the tones to coded form, means for applying a selected one of the coded tones to said first lead at the input to said delay means, and means for applying the coded, ringing tone concurrently to said first and second leads.

13. A telephone system comprising a plurality of lines divided into distinct groups, control means common to said groups, a transmission channel interconnecting each of said groups of lines with said control means, means associated with each group of lines for connecting the active lines in each group to said transmission channel in individual time intervals of a recurrent cycle of time intervals, means connected to said transmission channel for detecting all information transmitted from one of said active lines in the assigned time interval and for distinguishing between speech samples and supervisory indications contained in said transmitted information, means responsive to the output of said distinguishing means for establishing or disestablishing a connection of said active line to another one of said lines, and time slot transposing means in said control means for receiving information from one of said lines over said transmission channel in one time interval and transmitting it to another one of said lines over said transmission channel in a second time interval.

14. A telephone system comprising a plurality of lines including active lines communicating in pairs, a common transmission channel, a line gate terminating each of said lines for connecting said active lines to said channel in distinct time slots of a repetitive cycle, means connected to said channel for distinguishing between speech samples and supervisory indications provided to said channel by one of said active lines through the corresponding one of said line gates in the assigned time slot, and a marker unit for acting upon output indications provided by said distinguishing means to establish or disestablish a connection between said one active line and another one of said lines.

15. A telephone system in accordance with claim 14 wherein said transmission channel comprises a send lead and a receive lead and further comprising delay means connected to said send lead for receiving information from one line of a pair of lines in communication in the time slot assigned to said one line and means for selectively connecting one of a plurality of output terminals of said delay means to said receive lead for transmitting the information to the other line of said pair of lines in communication in the time slot assigned to said other line.

16. A telephone system in accordance with claim 15 and further comprising signaling means having a plurality of tone sources, means for coding the distinct frequency received from each of said tone sources, means for applying the coded ringing tone to said delay means in the time slot assigned to one of said pair of lines, and means for applying the coded ringing, dial and busy tones to said receive lead in the time slot assigned to the other one of said pair of lines.

17. A telephone system in accordance with claim 15 and further comprising memory means connected to said marker unit for storing an indication of the number of time slots intermediate the time slots assigned to said pair of lines and means for connecting the output of said memory means to the output terminals of said delay means to control the particular terminal of the delay means from which an output is derived in a given time slot.

18. A telephone system in accordance with claim 17 wherein said memory means comprises a counter circuit for designating the particular time slot assigned to one of said pair of lines, delay means connected to the output of each stage of said counter circuit, means for circulating the content of each of said delay means, and translating means connected to the output of each of said circulating means for designating the time slot assigned to the other one of said pair of lines.

19. A telephone system in accordance with claim 14 and further comprising memory means connected to said marker unit for storing in circulating delay means line identification signals in the time slots assigned to active ones of said lines, means for detecting a request for service by one of said lines and for applying signals identifying the requesting line to said marker unit, means in said marker unit for comparing said requesting line identification with each of the line identification designations stored in said memory means to verify the request for service, and means operative in response to said comparison means for writing the requesting line designation in said memory means in a selected time slot.

20. A telephone system in accordance with claim 19 wherein said memory means comprises a plurality of delay lines each having a delay equivalent to the number of time slots in the recurring cycle of time slots, each of a plurality of said delay lines containing one digit of a distinct active line designation in the corresponding assigned time slot, and means for applying the outputs of each of said plurality of delay lines to said distinct active line.

21. A communication system comprising a plurality of lines, a switching center, a transmission channel, a gate circuit terminating one end of said channel in said switching center, means for detecting requests for service by said lines and for assigning to each active line a distinct time interval in a recurrent cycle of time intervals, means for applying information samples and supervisory indications provided by the active lines to the other end of said transmission channel in the respective assigned time intervals, and means in said switching center connected to said gate circuit for discriminating between the information samples transmitted through said channel between an active pair of lines and supervisory indications transmitted through said channel between an active line and said switching center pursuant to the establishment and disestablishment of a connection between a pair of said lines, all of said information samples and said supervisory indications being received by said discriminating means through said gate circuit.

22. A communication system according to claim 21 wherein said discriminating means comprises delay means connected to said channel through said gate circuit so as to receive the information samples and supervisory indications provided by an active line and means for registering the content of said delay means detected at various output terminals providing signals which are delayed for distinct time intervals.

23. A communication system according to claim 21 wherein said transmission channel comprises a send lead and a receive lead and wherein each of said lines comprises means for modulating a line identification code signal with information samples and supervisory indications generated at a source connected to the line and means for gating the modulated signals to said send lead upon receipt at said gating means of said line identification code in the time interval assigned to the line.

24. A communication system according to claim 23 wherein each of said lines further comprises means for demodulating information samples and supervisory indications transmitted over said receive lead, means for gating the signals from said receive lead to said demodulating means upon receipt of the distinct line identification code in the time interval assigned to the line and means for transmitting the demodulated signals to the line terminal.

25. A communication system according to claim 21 wherein said switching center comprises marking means and a line number memory, said detecting means comprising means for registering a coded designation representative of each of said lines in sequence, a gating circuit, means for applying individual line condition signals to said gating circuit and means including said registering means for enabling said gating circuit to transmit an indication of an active line to said marking means, means in said marking means for comparing said active line identification with the identification of active lines currently stored in said line number memory and for producing a line identification if said active line is not currently identified in said line number memory, means for registering said active line identification in said line number memory in the first available time interval, and means for applying the registered line identification to the corresponding active line in the assigned time interval of each succeeding cycle of time intervals.

26. A communication system according to claim 21 wherein said switching center further comprises a plurality of circulating delay lines for registering in the form of a plural digit code the current state of the switching center in monitoring a potential or active connection between calling and called lines, means for transmitting signals to said delay lines so as to change only a single digit of said code in advancing from any call progress state to the next possible call progress state, and means for translating the plural digit code provided by said circulating delay lines in a given time interval of the recurrent cycle so as to provide a signal on a distinct output lead designating a particular call progress state.

27. A time division communication system comprising a plurality of lines, a transmission channel including a send lead and a receive lead for transmission in opposite directions, first means for connecting active ones of said lines to said channel in selected time slots of a repetitive cycle to transfer information from said active lines to said send lead, a gate circuit connected to said send lead, and means for discriminating between speech samples and supervisory indications received from a calling one of said active lines through said send lead and said gate circuit in the time slot assigned to said calling line, said first connecting means responsive to an output of said discriminating means for connecting the called line to said channel in a selected time slot.

28. A time division communication system in accordance with claim 27 wherein the time slot assigned to the calling line is distinct from the time slot assigned to the called line, said system further comprising delay means connected to send lead for receiving information from one of the pair of calling and called lines in communication in the time slot assigned to said one line, and switching means for selectively connecting one of a plurality of output terminals of said delay means to said receive lead for transmitting the information to the other line of said pair of calling and called lines in communication in the time slot assigned to said other line.

29. A time division communication system in accordance with claim 28 wherein said switching means comprises a plurality of gates connected to said output terminals at distinct intervals along said delay means, the delay in each interval corresponding to a time slot, and a plurality of crosspoint switches for connecting the output terminal of the selected delay means to said receive lead.

30. A time division communication system according to claim 28 wherein said discriminating means comprises a plurality of delay lines connected in cascade, said send lead being connected through said gate circuit to the input of the first delay line in the cascaded plurality of delay lines, means for detecting the presence of a signal in each of said cascaded delay lines in distinct time intervals, means connected to the output of one of said cascaded delay lines for registering dialed digits identifying the called line, and means for translating the content of said digit register means and for applying the resultant translated called line designation to said first connecting means.

31. A time division communication system comprising a plurality of lines, a transmission channel including a send lead and a receive lead for transmission in opposite directions, delay means terminating the send lead, time division switching means for connecting active ones of said lines to the corresponding transmission channel in distinct time slots of a repetitive cycle of time slots, means for completing a connection between a calling and a called line comprising means for connecting a selected output of said delay means to said receive lead in the time slots assigned to the respective calling and called lines, and means for registering the current state of the system in its progress toward establishment or disestablishment of the connection between said pair of lines, said call progress registering means comprising a plurality of delay means each having a distinct input from various system components for storing one digit of a plural digit code identifying a particular call progress state in a given time interval and means for changing the call progress state comprising means for altering only the signal applied to said input of a single one of said delay means.

32. A time division communication system in accordance with claim 31 and further comprising means for translating the coded number received from said delay means in parallel form into an output signal on a single lead identifying the current call progress state and means for connecting said single output lead to the various system components for controlling the subsequent action of the system in establishing or disestablishing a connection between a pair of said lines.

33. A time division telephone system comprising a plurality of lines, a common transmission channel, means for connecting said lines to said channel in distinct time slots of a repetitive cycle for transmitting both speech samples and supervisory indications generated in said lines in said distinct time slots over said common transmission channel, and means connected to said channel for distinguishing between said speech samples and said supervisory indications, said distinguishing means including a plurality of timing means each having a distinct time interval determined by the probability of the existence of speech signals during said distinct time interval.

34. A time division telephone system in accordance with claim 33 wherein said means for connecting said lines to said common transmission channel includes gate means and delta modulation means for each of said lines and wherein said timing means include delay means for circulating pulses representing said supervisory indications during the time periods when no signal changes are transmitted through said delta modulation means.

35. A telephone system comprising a plurality of lines, transmission means, line circuits including delta modulation means for connecting said lines to said transmission means for transmitting both speech and supervisory indications in the same manner over said transmission means, and means connected to said transmission means for distinguishing between said speech and said supervisory indications, said distinguishing means including a plurality of timing means each having a distinct time interval determined by the probability of the existence of a speech signal during said distinct time interval, each of said timing means including delay means for circulating pulses representing said speech and supervisory indications during the time intervals when no signal changes are transmitted through said delta modulation means.

References Cited by the Examiner

UNITED STATES PATENTS

| | | | |
|---|---|---|---|
| 2,935,569 | 5/1960 | Saal et al. | 179—15 |
| 3,015,699 | 1/1962 | Faulkner et al. | 179—15 |
| 3,030,448 | 4/1962 | Leonard et al. | 179—15 |
| 3,049,593 | 8/1962 | Touraton et al. | 179—15 |
| 3,060,268 | 10/1962 | Pinet | 179—15 |
| 3,083,267 | 3/1963 | Weller | 179—15 |
| 3,118,019 | 1/1964 | Feder et al. | 179—15 |

DAVID G. REDINBAUGH, *Primary Examiner*.